United States Patent
Morrison et al.

(10) Patent No.: US 11,624,852 B2
(45) Date of Patent: Apr. 11, 2023

(54) NATURAL EM SOURCE AIRBORNE GEOPHYSICAL SURVEYING SYSTEM

(71) Applicant: Geotech Ltd., Aurora (CA)

(72) Inventors: Edward Beverly Morrison, King City (CA); Carlos Izarra Teran, Aurora (CA)

(73) Assignee: Geotech Ltd., Aurora (CA)

( * ) Notice: Subject to any disclaimer, the term of this patent is extended or adjusted under 35 U.S.C. 154(b) by 450 days.

(21) Appl. No.: 16/752,065

(22) Filed: Jan. 24, 2020

(65) Prior Publication Data
US 2020/0241163 A1 Jul. 30, 2020

Related U.S. Application Data

(60) Provisional application No. 62/796,745, filed on Jan. 25, 2019.

(51) Int. Cl.
*G01V 3/17* (2006.01)
*G01V 3/38* (2006.01)

(52) U.S. Cl.
CPC .... *G01V 3/17* (2013.01); *G01V 3/38* (2013.01)

(58) Field of Classification Search
CPC .............. G01V 3/17; G01V 3/38; G01V 3/16
See application file for complete search history.

(56) References Cited

U.S. PATENT DOCUMENTS

| | | | |
|---|---|---|---|
| 8,289,023 B2 | 10/2012 | Kuzmin et al. | |
| 8,358,135 B2 | 1/2013 | Kuzmin et al. | |
| 2008/0091354 A1* | 4/2008 | Byerly | G01V 3/082 702/6 |
| 2010/0237870 A1* | 9/2010 | Dodds | G01V 11/00 324/331 |
| 2010/0244843 A1* | 9/2010 | Kuzmin | G01V 3/165 324/345 |
| 2015/0268369 A1* | 9/2015 | Dodds | G01V 3/10 324/334 |
| 2015/0369944 A1 | 12/2015 | Miles et al. | |

OTHER PUBLICATIONS

Abtahi, S. M.; et al. "Extracting geoelectrical maps from vintage very-low-frequency" Geophysics, vol. 81, No. 5 (Sep.-Oct. 2016); p. B135-B147.
Persson, L. et al. "New developments in the processing and interpretation of airborne VLF-EM data" SEG Int'l Exposition and Annual Meeting, San Antonio, TX, Sep. 9-14, 2001.
Gharibi, M. et al. "Transformation of VLF data into apparent resistivities and phases" Geophysics, vol. 64, No. 5 (Sep.-Oct. 1999); p. 1393-1402,7 Figs. 7.

(Continued)

*Primary Examiner* — Son T Le
*Assistant Examiner* — Adam S Clarke
(74) *Attorney, Agent, or Firm* — Ridout & Maybee LLP; David J. Greer

(57) ABSTRACT

A receiver coil assembly for a geophysical survey system comprising: a first receiver coil supported by a first tubular frame that forms a first loop; a second receiver coil supported by a second tubular frame that forms a second loop; releasable connectors connecting the first tubular frame to the second tubular frame with a sensing axis of the first receiver coil having a different orientation than a sensing axis of the second receiver coil.

12 Claims, 12 Drawing Sheets

(56) References Cited

OTHER PUBLICATIONS

Hyodo, D. et al. "Pseudo resistivity cross section imaging using VLF-EM data" Proceedings of the 11th SEGJ International Symposium; Yokohama, Japan; 2013.

Becken, M. et al. "Transformation of VLF anomaly maps into apparent resistivity and phase" Geophysics, vol. 68, No. 2 (Mar.-Apr. 2003); p. 497-505, 4 Figs.

* cited by examiner

NATURAL EM SOURCE AIRBORNE GEOPHYSICAL SURVEYING SYSTEM

RELATED APPLICATIONS

This application claims benefit of and priority to United States Provisional Patent Application No. 62/796,745, filed Jan. 25, 2019, the contents of which are incorporated herein by reference.

FIELD

This description relates to a multiple receiver coil system and apparatus for geophysical surveying using natural electromagnetic fields.

BACKGROUND OF THE INVENTION

Geophysical electromagnetic ("EM") prospecting techniques can be effective in determining the electrical conductivity of soils, rocks, and other bodies at and under the earth's surface.

Geophysical EM prospecting can be carried out using surface based equipment and airborne equipment. Airborne methods in which equipment is transported by aircraft such as helicopter, airplane or airship may be useful for large area surveys. For airborne electromagnetic ("AEM") systems, survey data may be acquired while an airplane or helicopter flies at a nearly constant speed along nearly-parallel and close to equally-spaced lines at an approximately constant height above ground. In some applications, geophysical EM prospecting of a seabed may be carried out using equipment located under the surface of a body of water.

Some geophysical surveying methods are active in that the equipment is used to transmit a signal to a targeted area, and then measure a response to the transmitted signal. Other geophysical surveying methods are passive in that signals produced from a target area are measured without first transmitting a signal to the target area.

An example of a passive geophysical EM prospecting method is Audio Frequency Magnetic ("AFMAG") surveying in which the EM fields resulting from naturally occurring primary signal sources such as lightning discharges are measured. These EM fields propagate around the earth as plane waves guided by the ionosphere and earth's surface. Lightning activity occurring remote from the measurement point can produce signals with a nearly flat spectral density at low frequencies between, for example, 20 Hz and 1000 Hz, varying with geographical location, time of the day, seasons and weather conditions. Examples of passive AFMAG geophysical EM prospecting systems are shown in U.S. Pat. Nos. 6,876,202 and 8,289,023.

SUMMARY

According to an example aspect is a system for geophysical surveying of a survey area, comprising: an airborne receiver coil assembly for suspending from an aircraft comprising three receiver coils each having a respective sensing axis substantially orthogonal to the sensing axis of each of the other two receiver coils, and a data collection and processing system. The data collection and processing system is configured to receive data from the airborne receiver coil assembly for a plurality of observation points in the survey area, the data including measurements of naturally occurring magnetic field data sensed by each of the three receiver coils for the observation points. The data collection and processing system is configured to also: transform the measured magnetic field data to the frequency domain; calculate and store magnetic transfer functions for a plurality of the observation points at a plurality of frequencies based on the transformed measured magnetic field data and reference magnetic field data; calculate electrical E-field values for the plurality of the observation points at the plurality of frequencies based on the calculated magnetic transfer functions, the reference magnetic field data, and reference electrical E-field data; calculate electrical impedance values for the plurality of the observation points at the plurality of frequencies based on the calculated E-field values and the transformed measured magnetic field data; and calculate and store resistivities for the plurality of the observation points at the plurality of frequencies based on the calculated electrical impedance values.

According to another example aspect is a method that includes: receiving airborne sensed magnetic field data including measurements of naturally occurring magnetic fields for observation points in a survey area sensed by three receiver coils of an airborne receiver coil assembly, each of the receiver coils having a respective sensing axis substantially orthogonal to the sensing axis of each of the other two receiver coils; calculating and storing magnetic transfer functions for the observation points at a plurality of frequencies based on the airborne sensed magnetic field data and reference magnetic field data; calculating and storing electrical E-field values for the observation points at the plurality of frequencies based on the calculated magnetic transfer functions, the reference magnetic field data, and reference electrical E-field data; calculating and storing electrical impedance values for the plurality of the observation points at the plurality of frequencies based on the calculated E-field values and the airborne sensed magnetic field data; and calculating and storing resistivities for the plurality of the observation points at the plurality of frequencies based on the calculated electrical impedance values.

According to one example aspect is a receiver coil assembly for a geophysical survey system comprising: a first receiver coil supported by a first tubular frame that forms a first loop; a second receiver coil supported by a second tubular frame that forms a second loop; and releasable connectors connecting the first tubular frame to the second tubular frame with a sensing axis of the first receiver coil having a different orientation than a sensing axis of the second receiver coil.

BRIEF DESCRIPTION OF THE DRAWINGS

Example embodiments of the invention are provided in the following description. Such description makes reference to the annexed drawings wherein.

Similar reference numerals are used throughout the drawings to denote similar elements.

DESCRIPTION OF EXAMPLE EMBODIMENTS

Receiver Coil Assembly

FIGS. 1 to 4 illustrate a multiple receiver coil assembly 10 for geophysical surveying, according to example embodiments of the invention. The receiver coil assembly 10 supports multiple receiver coils in a substantially fixed position relative to each other. As will be explained in greater detail below, in at least some configurations the receiver coil assembly 10 can allow a relatively low weight to coil size ratio, and in applications where the receiver coil assembly 10 is moved through a fluid such as air or water, can mitigate against drag.

In example embodiments, the receiver coil assembly 10 is designed such that it can be transported in an unassembled state to a survey location as a set of modular components contained in one or more standard size shipping containers. The receiver coil assembly 10 can then be assembled and used at the site location, and subsequently disassembled and repacked for shipment to a further survey location.

Figure 1:
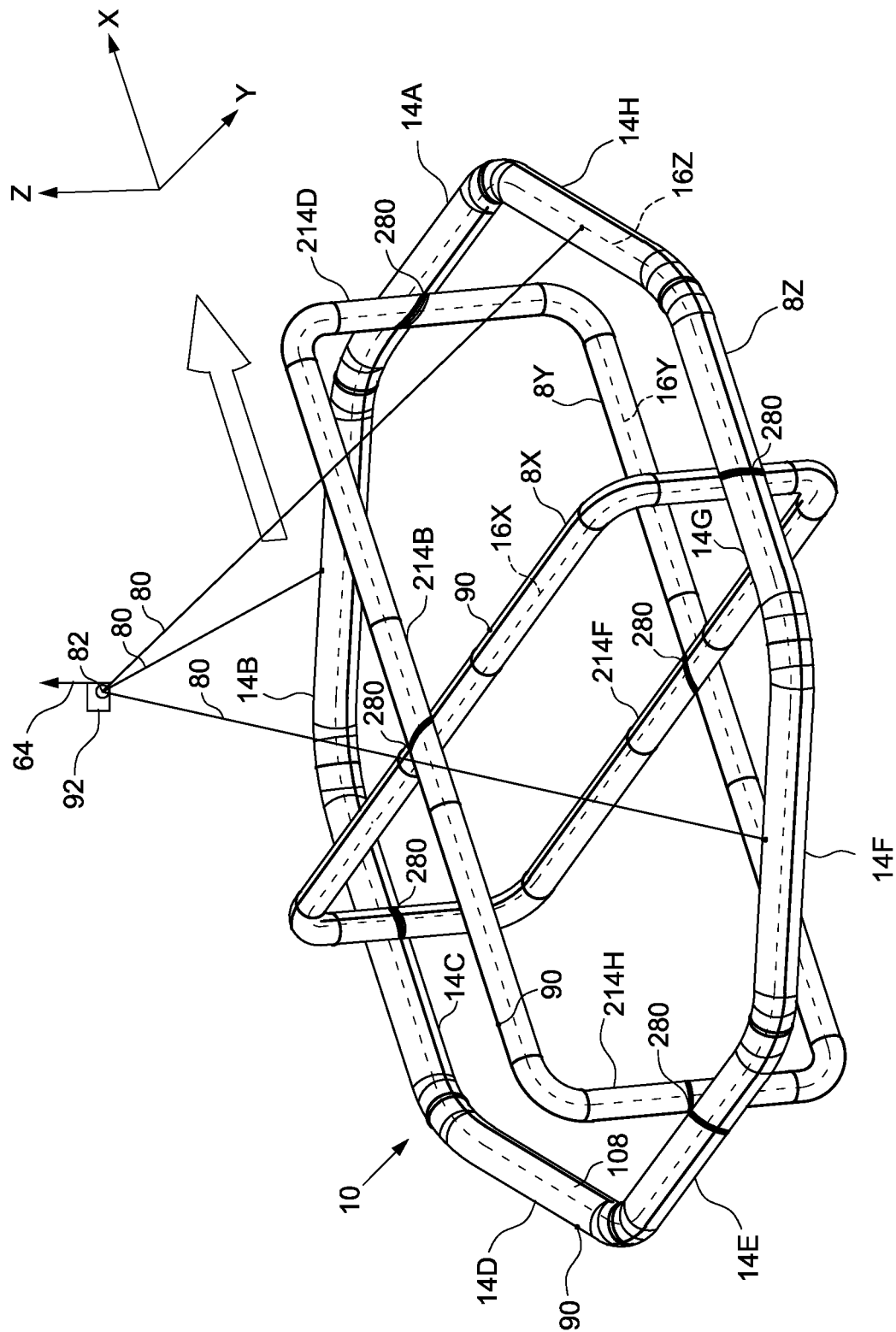
FIG. 1 is a perspective view of an example embodiment of a multiple receiver coil assembly according to one example embodiment.

The multiple receiver coil assembly 10 of FIG. 1 includes three coreless receiver coils 16Z, 16X and 16Y. Each of the coils 16Z, 16X and 16Y is wound in a respective plane and has a respective sensing or coil axis—in at least one example embodiment, the sensing axes of the three coils 16Z, 16X and 16Y intersect at a common central location, with each sensing axis being substantially orthogonal to axes of the other two coils. In one example, the receiver coil assembly 10 is configured such that during use: the coil 16Z is maintained with its coil or sensing axis in a generally vertical (Z axis) orientation Z axis; the coil 16X is maintained with its coil or sensing axis in a generally horizontal orientation, parallel to the direction of movement (X axis); and the coil 16Y is maintained with its coil or sensing axis in a generally horizontal orientation, perpendicular to the direction of movement (Y axis).

In an example embodiment, the receiver coil assembly 10 includes three interconnected tubular or hollow receiver coil frames 8Z, 8X and 8Y in which the coils 16Z, 16X and 16Y are respectively suspended. The coil frames 8Z, 8X and 8Y each form a loop around an open central area, and each coil frame 8Z, 8X and 8Y defines a respective internal loop passageway that extends around the central area. The loop passageway of each coil frame 8Z, 8X and 8Y houses a respective receiver coil 16Z, 16X and 16Y. In the presently described embodiment, receiver coil frames 8Z, 8X and 8Y and the respective receiver coils 16Z, 16X and 16Y that they support are each parallelogram shaped. In the illustrated example, frame 8Z and receiver coil 16Z have an octagonal loop shape, frame 8X and receiver coil 16X have a rectangular loop shape, and support frame 8Y and receiver coil 16Y also have a rectangular loop shape. In example embodiments, each of the receiver coil frames 8Z, 8X and 8Y is reliably secured to the other two receiver coil frames to facilitates assembly and disassembly of the receiver coil assembly 10.

Figure 2:
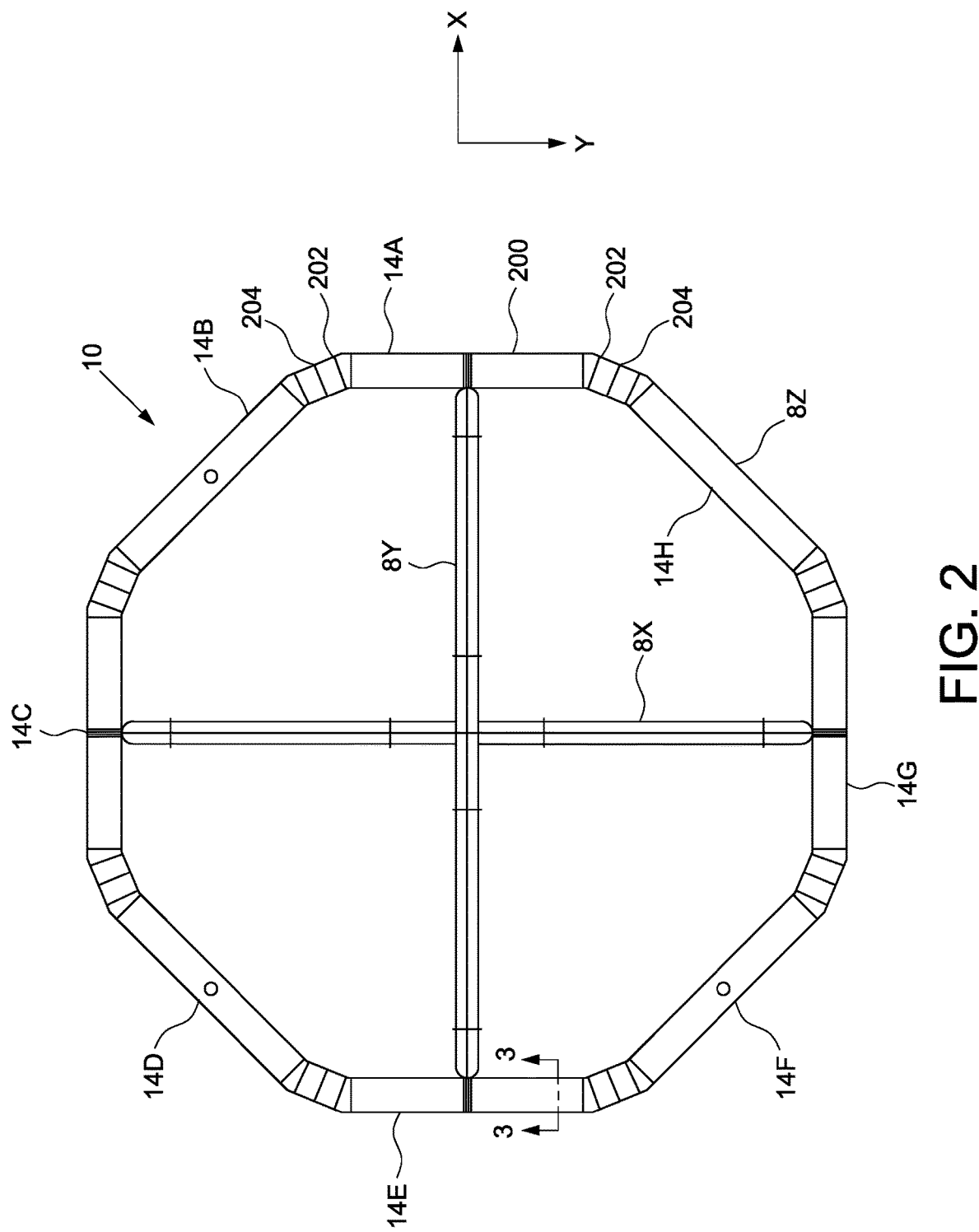
FIG. 2 is a top plan view of the receiver coil assembly of FIG. 1.

Receiver coil frame 8Z is configured to lie substantially in a horizontal plane when in use to support the Z-axis coil 16Z with its coil axis in the Z direction. Referring to FIG. 2, in one example, the coil frame 8Z is formed from eight substantially identical rigid tubular frame sections 14A-14G (referred to generically as frame sections 14). Each frame section 14 includes a straight central portion 200 with corner portions 202 at its opposite ends. Corner portions 202 each extend inward at a 22.5 degree angle from an axis of the straight central portion 200 such that the tubular frame sections 14A-14G can be joined together end-to-end to form octagonal receiver coil frame 8Z. In an example embodiment, a radial flange 204 is located at the distal end of each corner portion 202, with the radial flanges 204 of adjacent frame sections 14 (for example 14A and 14B) forming circumferential butt joints with aligned fastening holes through which bolts are inserted and secured with screws.

Figure 3:
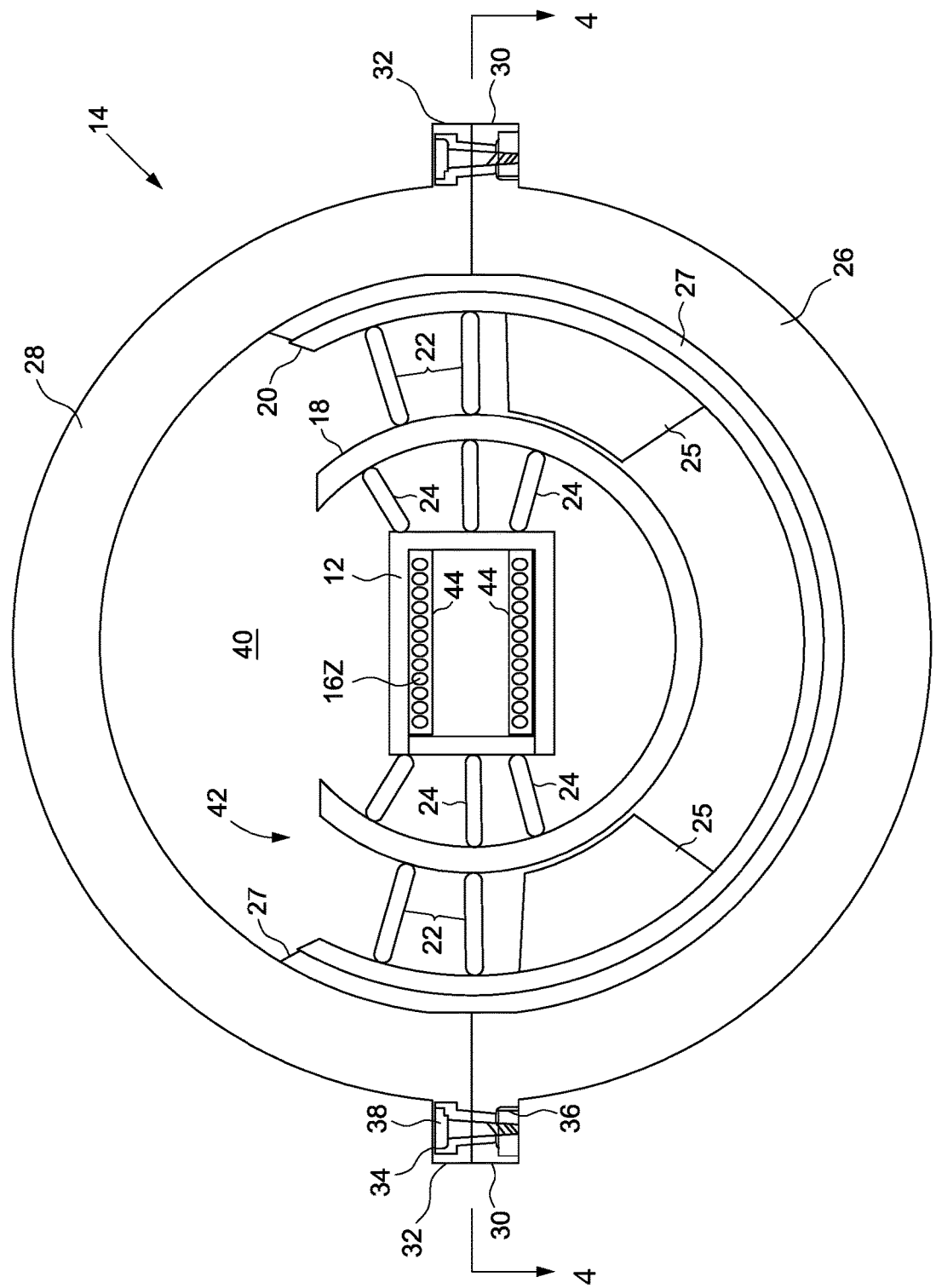
FIG. 3 is a side sectional view of a receiver coil frame and Z-axis receiver coil of the receiver coil assembly, taken along the lines 3-3 of FIG. 2.
Figure 4:
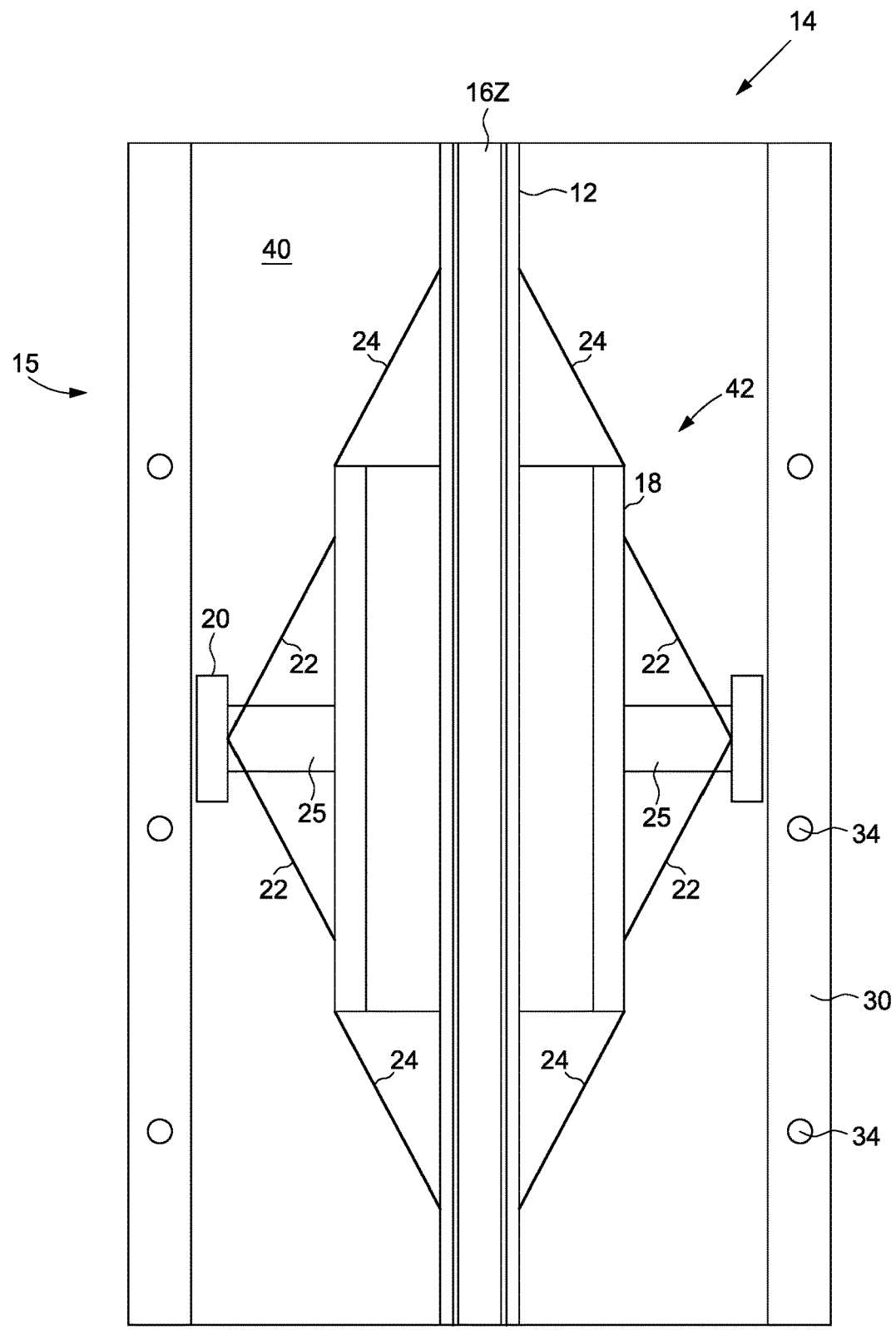
FIG. 4 is a top plan sectional view of the receiver coil frame and Z-axis receiver coil of the receiver coil assembly, taken along the lines 4-4 of FIG. 3.

FIG. 3 shows a sectional view taken along the lines 3-3 of FIG. 2 of a frame section 14, and FIG. 4 shows a perpendicular sectional view taken along the lines 4-4 of FIG. 3. As can be seen in FIGS. 3 and 4, in an example embodiment, the Z-axis coil 16Z is centrally suspended in the internal passage 40 of the frame section 14 by suspension assemblies 42. In order to facilitate assembly of the coil frame 8Z, each of the sections 14 include a lower half-cylindrical section 26 and an upper half-cylindrical section which are secured together by mating peripheral flange portions 30, 32 to define the internal receiver coil passage 40. Bolts 38 or other fasteners can pass through aligned fastening holes 34 in flanges 30, 32 and secured by embedded nuts 36 to secure the half-cylindrical sections 26, 28 together. Half-cylindrical sections 26, 28 may for example be formed from a lightweight rigid composite material that allows electromagnetic signals to pass through with minimal or no interference to receiver coil 16Z.

In example embodiments, the receiver coil 16Z is formed from eight (8) turns of a twelve (12) conductor ribbon cable 44 that is contained within an inner frame 12, although other receiver coil configuration could alternatively be used. As shown in FIGS. 3 and 4, the inner frame 12 has a rectangular cross-section to accommodate eight layers of the ribbon cable 44. In example embodiments the inner frame 12 includes straight sections that correspond in length to the straight regions 200 of outer coil frame sections 14 and corner sections that correspond to the corners of the receiver coil frame 8Z. In one example, the corner sections of the inner frame 12 are removable from ribbon cable 44 to allow the straight sections that contain the receiver coil 16Z to be folded together in switch-back fashion for transportation. The inner frame 12 can be formed from rigid EM permeable plastic material such as PVC.

In example embodiments, the inner frame 12 is elastically suspended within the tubular frame sections 14 at or near the center of the coil loop passage 40 by multiple suspension assemblies 42 that are spaced internally along the length of each of the tubular frame sections 14. As seen in FIGS. 3 and 4, each suspension assembly 42 employs a double suspension system to suspend the receiver coil interior frame 12. In particular, the interior frame 12 is attached by a set of first elastic suspension members 24 to an intermediate support member 18 which is in turn attached by a set of second elastic members 22 to the outer frame section 14. In the illustrated embodiment the intermediate support member 18 is semi-cylindrical and includes an open top to accept installation of the interior frame during assembly 74. The set of first elastic suspension members 24 are attached between the intermediate support member 18 and the interior frame 12 at angles to apply radial tension on the interior frame 12 as well as to apply opposed axial tension. In an example embodiment, a semi-cylindrical anchor member 20 is secured to the inner wall of the lower half-cylindrical section 28 of the frame section 14, and the set of second elastic members 22 are secured between the intermediate support member 18 and the anchor member 20 to apply radial tension and opposed axial tension on the intermediate support member 18.

Supplemental foam dampers 25, which may for example be formed from acoustic foam, may also be secured to the anchor member 20 to engage the intermediate support member 18 and dampen its radial movement. In an example embodiment, as seen in FIG. 3, the semi-cylindrical anchor member 20 has an upper opening to receive the intermediate support member 18 and inner support frame 12 during assembly. The semi-cylindrical anchor member 20 may extend above the lower half-cylindrical section 28 in order to accommodate elastic suspension members 22 that are secured above the lower half-cylindrical section 28. A layer of resilient material 27 may be secured between the anchor member 20 and the support frame section 14 to provide additional damping. In some examples, the inner frame 12 is supported by two spaced apart suspension assemblies 42 in each of the straight frame sections 200, however the number of support assemblies can be different in different embodiments.

In some example embodiments, the elastic suspension members 22, 24 are formed from O-ring rod or other suitable elastic material and may be connected to the respective components by cable ties that pass through pre-drilled holes or attached loops. Alternatively, any number of other possible methods can be used to attach the first and second elastic suspension members including: hooks, or a machined hook-like attachment point connected to the attachment points whereby the suspension members may be looped around the hooks and then covered by silicone; alternatively, loops on the first and second suspension members can be screwed into the attachment points; another possibility is to glue the first and second suspension members to the inner frame, and to the outer frame or intermediate support members.

As shown in FIGS. 3 and 4 both the first and second suspension members 22 and 24 extend at an angle other than 90 degrees to both radially and longitudinally bias the inner frame section 12 in a central position in internal receiver coil passage 40. The suspension arrangements that are discussed above may in at least some embodiments improve the signal to noise ratio ("SNR") of the receiver coil assembly by reducing the effects of vibration of the receiver coil assembly 10 on the receiver coil 16Z. In other example embodiments, other support mechanisms can be used including triple-suspension, springs, surrounding the coil with foam, or other means of positioning the coil in the centre of the inner frame in a manner that reduces noise.

In one example embodiment, the cross-sectional inside diameter of tubular section 14 is twelve (12) inches, and the loop diameter of the Z axis receiver coil 16Z and tubular frame 8Z is approximately 26 feet, however several other coil and frame sizes are possible. Additionally, tubular frame 8Z could have a shape other than octagonal such as circular or another shape that approximates a circle.

Figure 5:
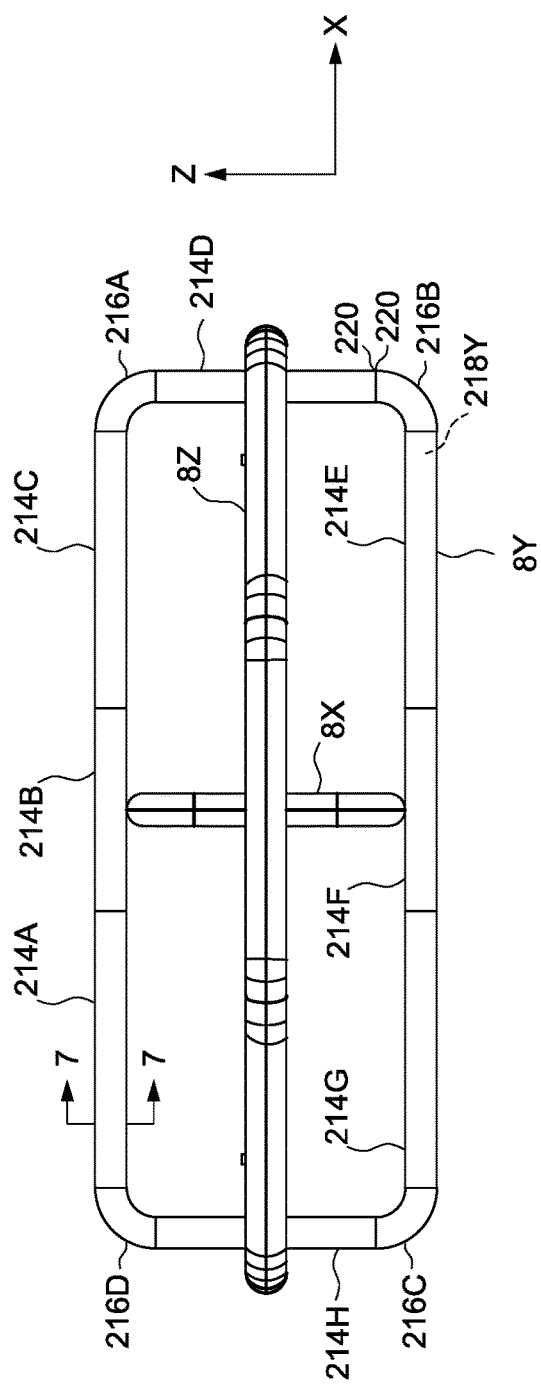
FIG. 5 is side view the receiver coil assembly of FIG. 1.

Referring to FIG. 5, the Y-axis receiver coil frame 8Y/receiver coil 16Y are of similar construction to Z-axis receiver coil frame 8Z/receiver coil 16Z, except for differences that will be apparent from the Figures and the following description. In one example, the coil frame 8Y forms a rectangular loop with a horizontal (X-axis) dimension that is greater than a vertical dimension (Z-Axis dimension). In operation the frame 8Y is oriented in a generally vertical direction, parallel to the direction of travel (X-axis) such that the coil axis of the Y-axis coil 16Y is maintained in a horizontal axis that is generally perpendicular to the direction of travel. As illustrated, the Y-axis receiver coil frame 8Y includes four sides formed from rigid tubular straight frame sections (referred to individually as straight frame sections 214A to 214H and generically as straight frame sections 214), and four 90 degree tubular corner frame sections (referred to individually as corner frame sections 216A to 216D and generically as corner frame sections 216). The straight frame sections 214 and corner sections 216 are hollow and collectively define a continuous internal loop passageway 218Y in which Y-axis receiver coil 8Y is suspended. In an example embodiment, a radial flange 220 is located at the distal ends of each of the straight frame sections 214 and corner sections 216, with the radial flanges 220 of adjacent frame sections 14 (for example 214D and 216B) forming circumferential butt joints with aligned fastening holes through which bolts are inserted and secured with screws. In the illustrated embodiment, the top and bottom sides of the receiver coil frame 8Y includes three straight sections 214A, 215B, 214C and 214E, 214F, 214G, respectively, and the vertical sides each include one straight section 214D and 214H, respectively.

Figure 6:
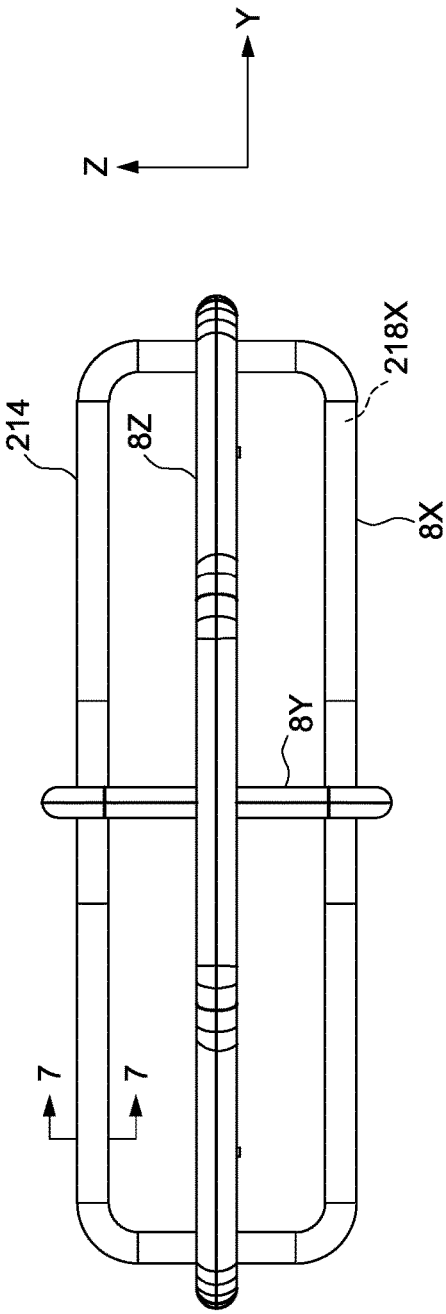
FIG. 6 is front view the receiver coil assembly of FIG. 1.

Referring to FIG. 6, the X-axis receiver coil frame 8X/receiver coil 16X is substantially identical in configuration and construction to Y-axis receiver coil frame 8Y/receiver coil 16Y, except that the X-axis receiver coil frame 8X has a lower vertical height than the Y-axis receiver coil frame 8Y to allow it to be vertically nested within the Y-axis receiver coil frame 8Y. In operation the frame 8X is oriented in a generally vertical direction, perpendicular to the direction of travel (X-axis) such that the coil axis of the X-axis coil 16X is maintained in a horizontal axis that is generally parallel to the direction of travel.

In a non-limiting example configuration, the Y-axis receiver coil frame 8Y has a vertical dimension of approximately seven (7) feet and a horizontal dimension of approximately twenty-four (24) feet and the X-axis receiver coil frame 8X has a vertical dimension of approximately seven (6) feet and a horizontal dimension of approximately twenty-four (24) feet, with the internal loop passageway way in each frame 8Y, 8Z having a cross-sectional inside diameter of 8.625 inches.

Figure 7:
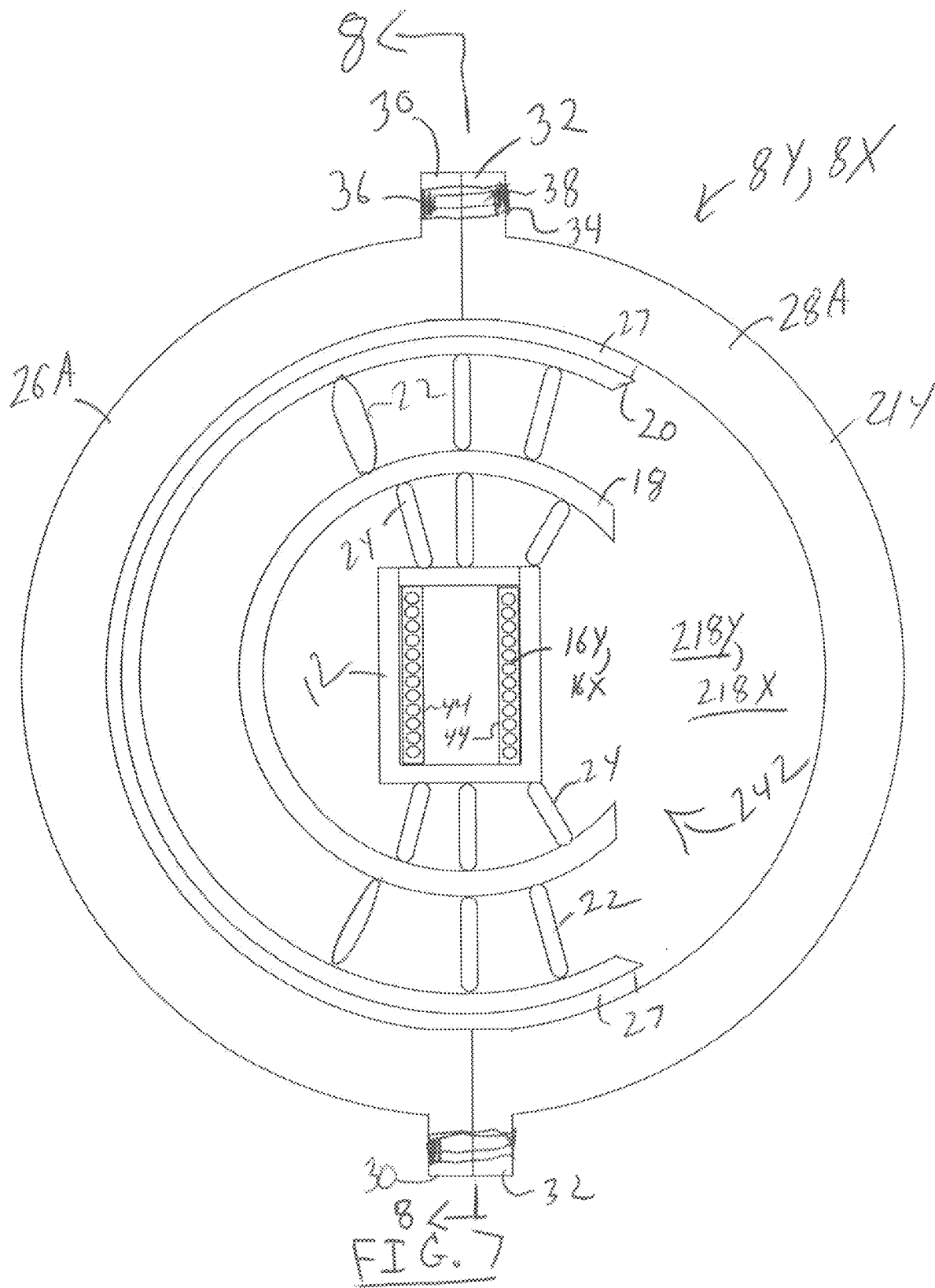
FIG. 7 is a side sectional view of a receiver coil frame and receiver coil of the receiver coil assembly, taken along the lines 7-7 of FIG. 5 or 6.
Figure 8:
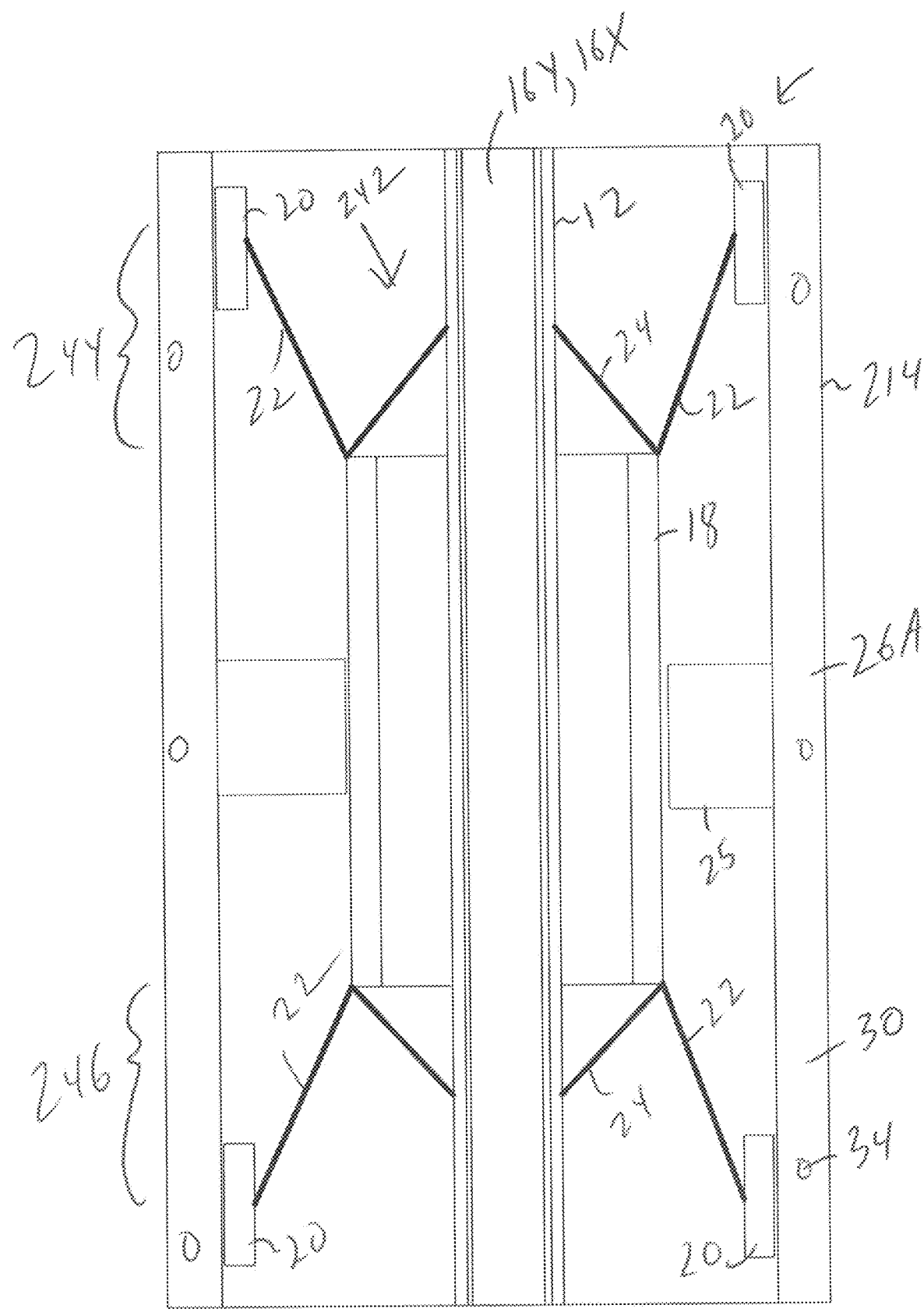
FIG. 8 is a top plan sectional view of the receiver coil frame and receiver coil of the receiver coil assembly, taken along the lines 8-8 of FIG. 7.

In example embodiments, the Y and X-axis receiver coil frames 8Y, 8X have an internal that is identical to each other and similar to that of receiver coil frame 8Z. In this regard, FIG. 7 shows a sectional view taken along the lines 7-7 of FIG. 5 or 6 of a frame section 214 of either Y-axis frame 8Y or X-axis frame 8X, and FIG. 7 shows a perpendicular sectional view taken along the lines 8-8 of FIG. 7. As can be seen in FIGS. 7 and 8, in an example embodiment, the Y and X axis coil 16Y and 16X are each centrally suspended in the internal passage 218Y, 218X, respectively of the frame section 214 by suspension assemblies 242. In order to facilitate assembly of the coil frames 8Y, 8X, each of the sections 214 include first a second half-cylindrical sections 26A and 28A which are secured together by mating peripheral flange portions 30, 32 to define the internal receiver coil passage 218Y or 218X. Bolts 38 or other fasteners can pass through aligned fastening holes 34 in flanges 30, 32 and secured by embedded nuts 36 to secure the half-cylindrical sections 26A, 28A together. Half-cylindrical sections 26A, 28A may for example be formed from a light-weight rigid composite material that allows electromagnetic signals to pass through with minimal or no interference to receiver coil 16Y or 16X.

In example embodiments, similar to receiver coil 16Zm the receiver coils 16Y and 16X are also each formed from eight (8) turns of a twelve (12) conductor ribbon cable 44 that is contained within an inner frame 12, although other receiver coil configuration could alternatively be used. As shown in FIGS. 7 and 8, the inner frame 12 has a rectangular cross-section to accommodate eight layers of the ribbon cable 44. In example embodiments the inner frame 12 includes straight sections that correspond in length to the straight sections of the coil frames 8Y, 8X and corner sections that correspond to the corners of the receiver coil frames 8Y, 8X. In one example, the corner sections of the inner frame 12 are removable from ribbon cable 44 to allow the straight sections that contain the receiver coils 16Y, 16X to be folded together in switch-back fashion for transportation. The inner frame 12 can be formed from rigid EM permeable plastic material such as PVC.

As with receiver coil 16Z, in example embodiments, the inner frames 12 that houses receiver coils 16Y and 16X are also elastically suspended within their respective tubular frames 8Y, 8X at or near the center of the coil loop passage 218Y, 218X by multiple suspension assemblies 242 that are spaced internally along the length of each of the tubular frame sections. As seen in FIGS. 7 and 8, each suspension assembly 242 employs a double suspension system to suspend the receiver coil interior frame 12. In particular, the interior frame 12 is attached by a set of first elastic suspension members 24 to opposite ends of an intermediate support member 18 which is in turn attached aby a set of second elastic members 22 to the outer frame section 214. In the illustrated embodiment the intermediate support member 18 is semi-cylindrical and includes an opening to accept installation of the interior frame during assembly. The set of first elastic suspension members 24 are attached between the intermediate support member 18 and the interior frame 12 at angles to apply radial tension on the interior frame 12 as well as to apply opposed axial tension. The suspension system 242 is similar to the suspension system 42 discussed above, with one difference being that two semi-cylindrical anchor member 20 (as opposed to one) are secured to the inner wall of the lower half-cylindrical section 28 of the frame section 14, and a first set 244 of second elastic members 22 are secured between one end of the intermediate support member 18 and one of the anchor members 20 to apply radial tension and axial tension in a first direction on the intermediate support member 18, and a second set 246 of second elastic members 22 are secured between the other end of the intermediate support member 18 and the other one of the anchor members 20 to apply radial tension and axial tension in a second direction on the intermediate support member 18. Additionally, supplemental foam dampers 25 are secured to the frame section 214 between the two anchor members 20 to engage the intermediate support member 18 and dampen its radial movement. In an example embodiment, as seen in FIG. 7, the semi-cylindrical anchor members 20 each have an opening to receive the intermediate support member 18 and inner support frame 12 during assembly. A layer of resilient material 27 may be secured between the anchor members 20 and the support frame section 214 to provide additional damping. In some examples, the inner frame 12 is supported by multiple spaced apart suspension assemblies in each of the straight frame sections 214.

In some embodiments the location and positioning of the suspension assemblies 42, 142 may vary throughout the receiver coil assembly—for example, a greater number of elastic suspension members may be positioned at an intended top of the assembly than are positioned toward a bottom.

In example embodiments the three receiver coil frames 8Z, 8X and 8Y can each be assembled independently of each other and then secured together. As shown FIGS. 1, 2, 5 and 6, in one embodiment, once assembled the Y-axis frame 8Y is nested within the Z-axis frame 8Z, and the X-axis frame 8X is nested within both the Y-axis frame 8Y and the Z-axis frame, such that the Z-axis receiver coil 16Z has a substantially vertical sensing axis, and the X and Y coils 16X, 16Y have orthogonal horizontal sensing axes. As shown in FIG. 1, in an example embodiment, each of the coil frames is secured at two locations to each of the other two coil frames by a 90 degree fixed collar coupler 280. Front vertical tubular section 214D of Y-axis frame 8Y is secured at its midpoint to a midpoint of the front tubular section 14A of Z-axis frame 8Z by a 90 degree collar coupling 280 and rear vertical tubular section 214H of Y-axis frame 8Y is secured at its midpoint to a midpoint of the rear tubular section 14E of Z-axis frame 8Z by a further 90 degree collar coupling 280. Top horizontal tubular section 214B of Y-axis frame 8Y is secured at its midpoint to a midpoint of the top horizontal section of X-axis frame 8X by a 90 degree collar coupling 280 and bottom horizontal tubular section 214F of Y-axis frame 8Y is secured at its midpoint to a midpoint of the bottom horizontal tubular section of X-axis frame 8X by a further 90 degree collar coupling 280. The port side vertical tubular section of X-axis frame 8X is secured at its midpoint to a midpoint of the port side tubular section 14C of Z-axis frame 8Z by a 90 degree collar coupling 280 and the starboard vertical tubular section of X-axis frame 8X is secured at its midpoint to a midpoint of the starboard tubular section 14G of Z-axis frame 8Z by a further 90 degree collar coupling 280. As can be seen in the Figures, and as noted in the description above, the X-axis frame 8X has a shorter vertical height which allows it to nest within the Y-axis frame 8Y. In such a configuration, the X-axis frame 8X presents the largest surface area relative to the direction of travel, but is also the smallest of the three frames. In other embodiments the frames may have different relative sizes and configurations.

Figure 9:
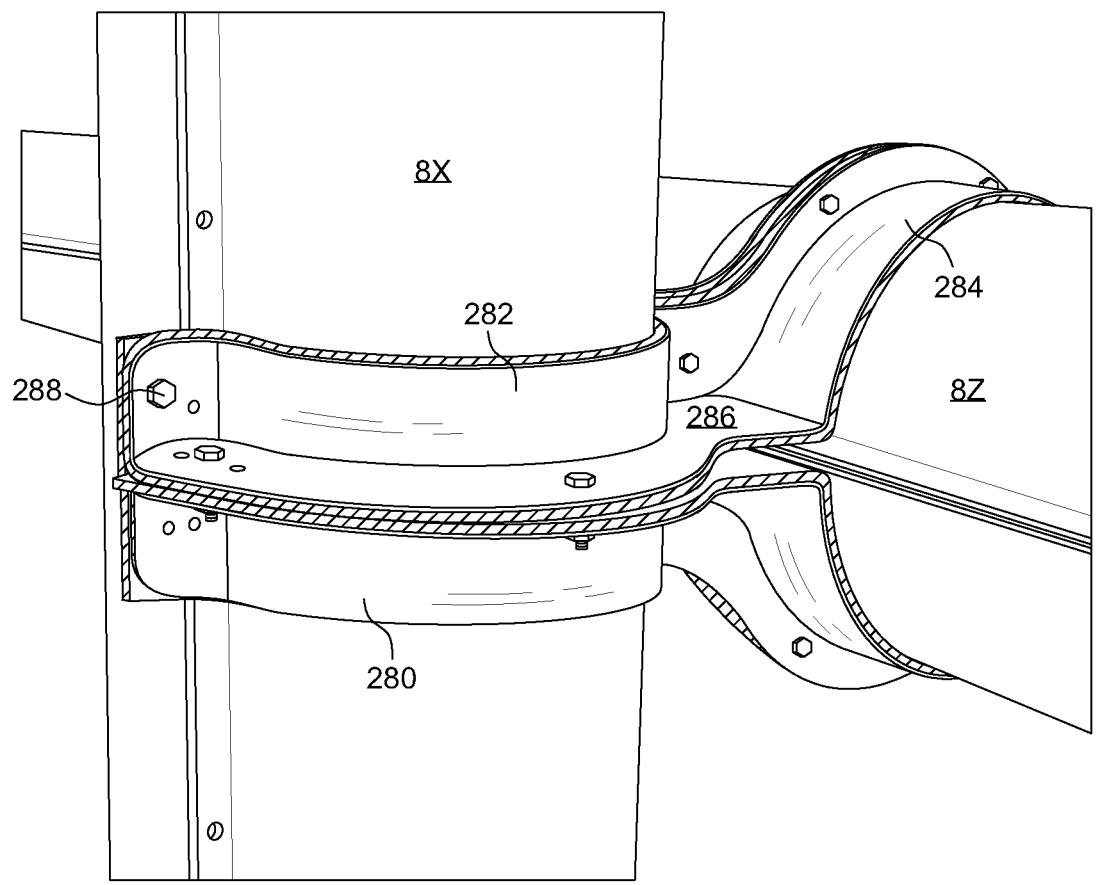
FIG. 9 is a perspective view (photograph) showing a close up of a 90 degree collar coupler joining two receiver coil frames of the receiver coil assembly of FIG. 1.

FIG. 9 shows an example of a 90 degree collar coupling 280 in greater detail, securing frame 8X to frame 8Z. As can be seen in FIG. 9, the coupling 280 includes a first collar 282 and a second collar 284 that are disposed at 90 degrees relative to each other and connected by an intermediate section 286. The first collar 282 includes mating flanges that are secured together by bolts 288 and nuts to releasably secure the collar 282 to frame 8X, and second collar 284 is similarly secured to frame 8Z.

In at least some configurations, the skeletal orthogonal-frame receiver coil assembly 10 provides relatively light weight structure for housing and supporting the three receiver coils 16Z, 16X and 16Y in three orthogonal planes with their respective sensing axes all passing through a common central point. Furthermore, the skeletal nature of the receiver coil assembly can mitigate the drag caused by a fluid such as air or water passing through the assembly 10 when compared for example to a solid spherical tow assembly. The elasticised suspension of the internal frames 12 can in at least some applications mitigate against noise causing vibrations that the receiver coils may otherwise be subjected to. The structure of assembly 10 can in at least some example embodiments provide a strong structure for maintaining the receiver coils 16Z, 16X and 16Y in substantially stable positions relative to each other.

In some example embodiments, use of releasable collar connectors 280 allows the receiver coil assembly 10 to be assembled and used without one or both of the X and Y receiver coils 16X, 16Y if desired. For example, the receiver coil assembly 10 could be used with only the Z-axis receiver coil 16Z and frame 8Z. Alternatively, the X and Y receiver coils and frames 16X,8X and 16Y, 8Y could be assembled and used independently of the Z-axis receiver coil and frame 16Z, 8Z.

FIG. 1 illustrates one possible towing assembly for towing the receiver coil assembly 10 from an aircraft or other carrier. In the illustrated example, the towing assembly includes four connecting ropes 80 have first ends that are each respectively connected to four tubular sections 14H, 14B, 14D, 14F of the Z-axis frame 8Z and opposite ends that are connected to a common connector 82. The first ends of the connecting ropes 80 can for example be connected to connecting loops or eyes provided on the tubular sections 14H, 14B, 14D, 14F, or be tied directly to the frame 8Z. The common connector 82 is connected to the end of a tow rope 64, which is attached to an aircraft. The lengths of the respective connecting ropes 80 can be different from one rope to the next and can be selected to provide the tow assembly 10 with different desired orientations at different horizontal flight speeds. For example, the connecting rope 80 lengths could be selected (for example longer ropes at the back than at the front) so that at a typical survey speed the receiver coil 8Z has a generally vertically oriented sensing axis and the coils 8X and 8Y have generally horizontally oriented sensing axes that are parallel and perpendicular, respectively, to the direction of travel. In some embodiments one or more fins or baffles formed from fabric or other light-weight material can be selectively placed on one or more portions of the tow assembly 10 to provide an air interface surface to result in a desired orientation of the tow assembly 10 during flight.

In some example embodiments, pre-amplifiers are included in the receiver coil assembly 10 and connected to leads from the receiver coils 16Z, 16X and 16Y for amplifying the signals received by receiver coils 16Z, 16X and 16Y. For example, pre-amplifiers 86 can be provided inside each of the frames 8Z, 8X, 8Y. A junction box 108 can be connected to each of the receiver coils 16Z, 16X and 16Y through pre-amplifiers 86. The junction box 108 is in turn connected to electrical cables 124 that extend adjacent one of the connecting cables 80 and along the tow rope 64 to a data monitoring computer that receives information from the receiver coils 16Z, 16X and 16Y, and a power source used for powering pre-amps 86 and other active devices such as GPS receivers or other positional devices that may be attached to the receiver coil assembly 10.

In some example embodiments sensors 90 that sense one or more of position and attitude (for example GPS sensors and/or accelerometers and/or gyroscopic sensors) can be located at one or more locations of the receiver coil assembly 10—for example, FIG. 1 illustrates three sensors 90 located at three respective locations of the assembly 10, which each include a GPS antenna are electrically connected to an aggregating GPS receiver 92 that is mounted to the tow cable connector 82 or tow cable 64. In some example embodiments, other positional technology could be mounted to the assembly 10, for example the Novatel™ SPAN positioning technology such as the SPAN IMU-LN200 or SPAN CPT—on some cases a sub-frame may be attached to one or more of frames 8Z, 8X, 8Y to mount positioning technology at the center of the receiver coil assembly 10.

A description of example embodiments of a receiver coil assembly 10 having been provided, some examples of how a receiver coil assembly 10 can be used will now be explained in greater detail.

Multi-Axis AFMAG

In one example embodiment, receiver coil assemblies 10 are used in the implementation of an airborne AFMAG geological survey system for measuring low frequency naturally occurring electromagnetic fields such as audio and sub-audio frequency magnetic fields resulting from naturally occurring signal sources such as lightening discharges.

Figure 10:
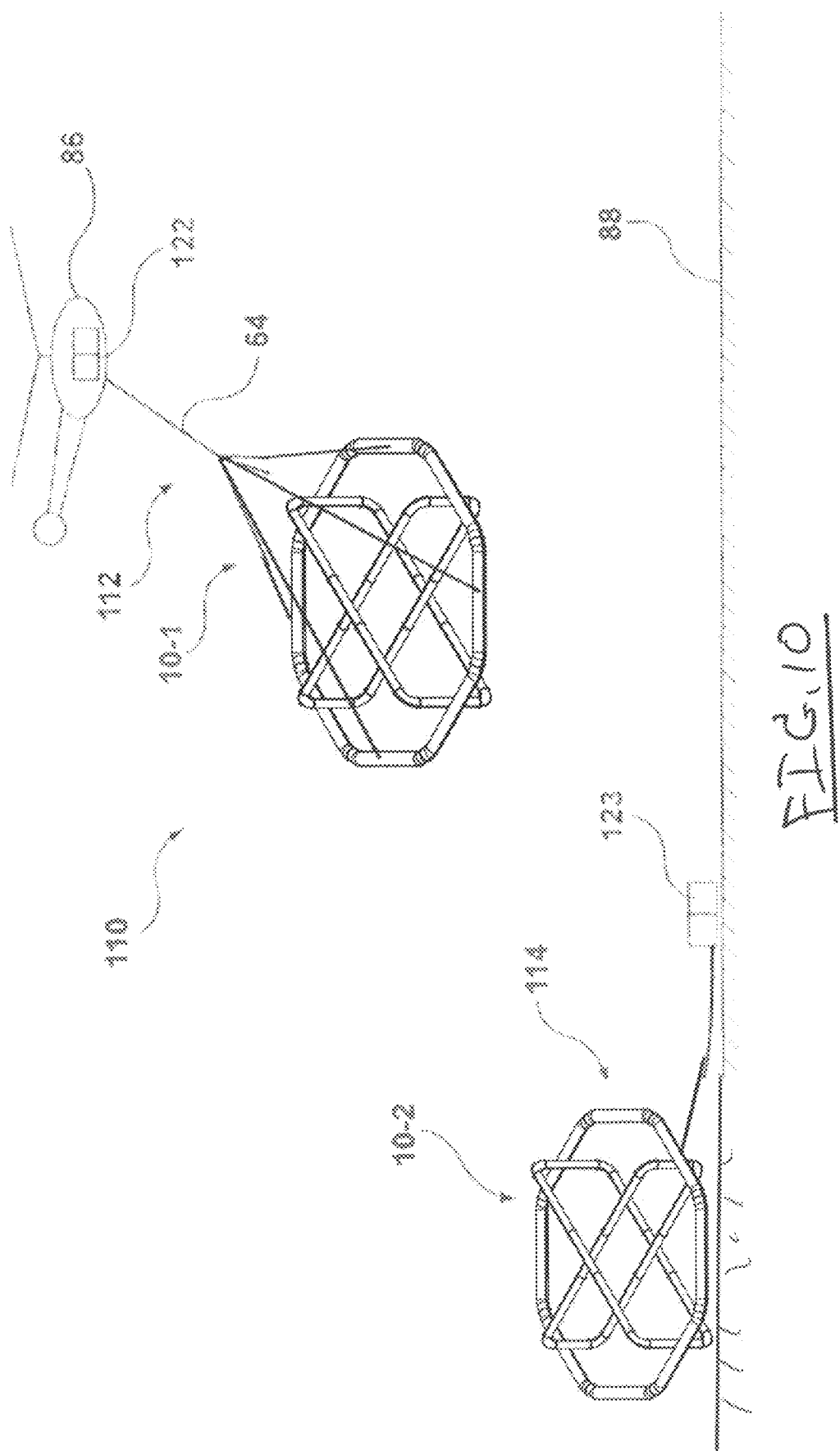
FIG. 10 shows a representation of an AFMAG geophysical prospecting system according to one example embodiment of the invention.

Referring to FIG. 10, a geophysical prospecting system 110 according to one example embodiment of the invention includes at least two spatially separated sensor systems 112, 114 for simultaneously measuring three magnetic field vector magnitudes at two different locations in a survey region. In one example embodiment, the sensor systems 112 and 114 are substantially functionally equivalent and each include three orthogonal magnetic sensors. One sensor system 112 includes a towed receiver coil assembly 10-1 suspended from a tow cable 64 and towed by an aircraft 86 such as a helicopter or airplane or airship over a survey region, and the other sensor system 114 includes a ground based reference receiver coil assembly 10-2 that is stationary and located on the ground 88. As will be explained in greater detail below, each of the sensor systems 112, 114 includes three electromagnetic sensors arranged for measuring the magnitude of the audio-electromagnetic field in three different directions. In one example embodiment, the receiver coil assemblies 10-1 and 10-2 are each implemented using a receiver coil assembly that is substantially identical to either the receiver coil assembly 10 described above in respect of FIGS. 1-9.

As known in the art, the Earth's natural electromagnetic field in the audio-frequency range can be observed and measured almost everywhere. The most stable frequency range that is least dependent on ionosphere conditions changes is typically 8-400 Hz, which is thus a convenient range for geophysical surveys. In some applications, the measurement range begins at approximately 25 Hz because motion-induced noise on an aircraft towed sensor assembly tends to be greater at lower frequencies, however in some configurations it may be possible to measure at frequencies lower than 25 Hz, such as 8 Hz, and higher than 400 Hz. In some examples, the applicable frequency range is 20 Hz to 1000 Hz. When a region has an electrically homogeneous material beneath the earth's surface, the magnetic component of the alternating natural electromagnetic fields in the region will also be homogeneous. Thus, when a survey of the region is conducted using an airborne sensor system 112 and a stationary base station sensor system 114, the vector magnitudes of the audio magnetic field measured at the stationary reference station sensor system 112 and the aircraft towed sensor system 114 will typically be the same except for differences due primarily to the sensor system's 112, 114 spatial separation. In the case where underground conductors or other scattering bodies are present, the field intensity in a region is non-homogeneous, and varies throughout the region due to additional electromagnetic fields generated by the eddy currents induced through natural electromagnetic events in the underground conductors.

In at least some applications, the geophysical prospecting system 110 described herein may be used to detect total filed anomalies which may be stronger than the Z-component-only anomalies which are used in traditional Z-axis AFMAG systems, thereby providing a better signal-to-noise ratio.

Figure 11:
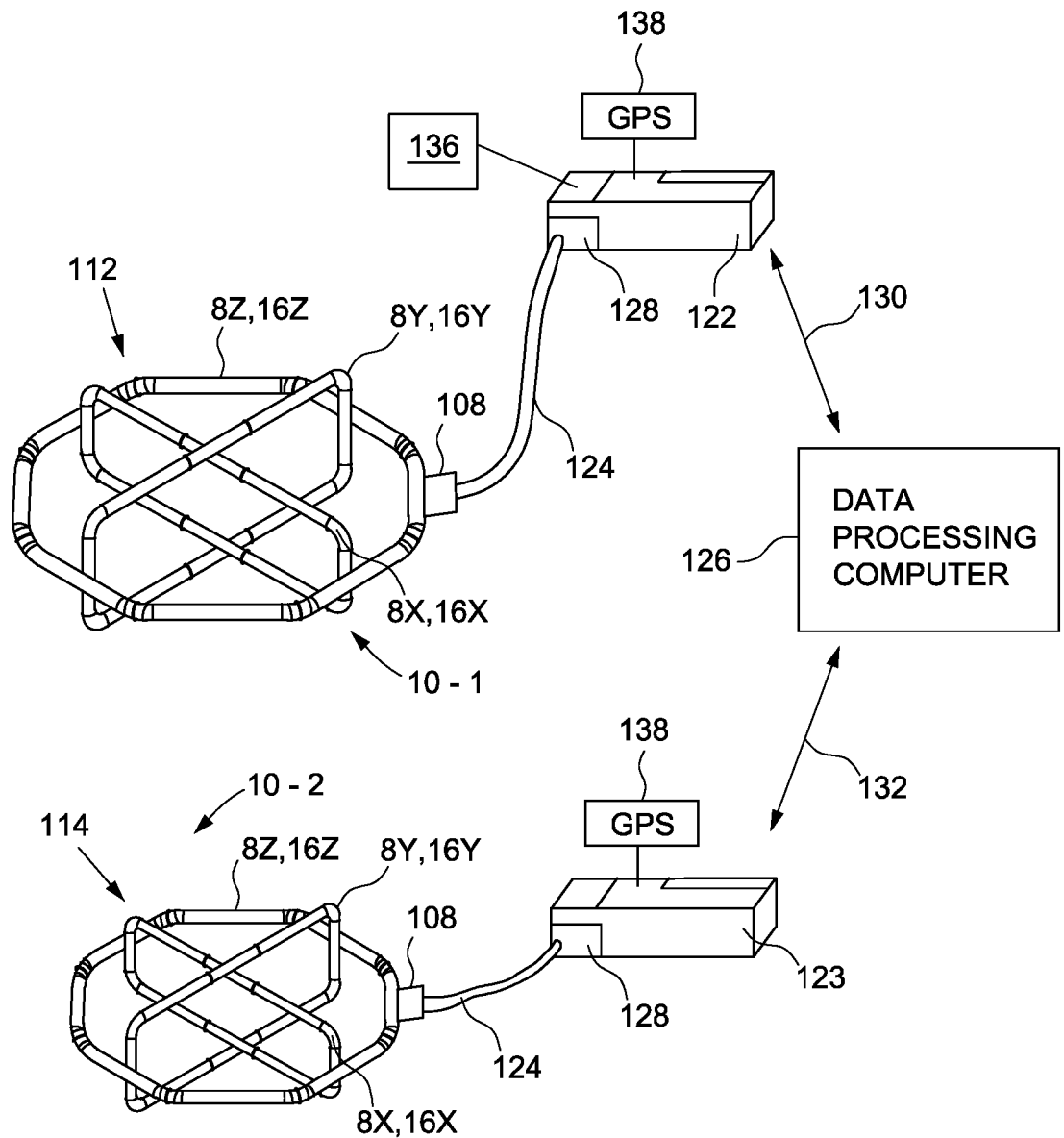
FIG. 11 is a schematic view of the geophysical prospecting system of FIG. 10.

An overview having been provided, the airborne geophysical prospecting system 110 will now be described in greater detail with reference to FIGS. 10 and 11. In one example embodiment, the towed receiver coil assembly 10-1 of the airborne sensor system 112 includes three electromagnetic sensors in the form of three substantially planar receiver coils 16Z, 16X and 16Y that are substantially orthogonal to each other, as described above in respect of receiver coil assembly 10. Although the X, Y and Z coil sensing axes are configured to generally respectively align with the direction of flight (X axis), the direction perpendicular to flight (Y axis) and the vertical (Z axis), in operation the receiver coil assembly will move relative to any external reference and accordingly the X, Y and Z sensing axis are fixed relative to receiver coil assembly 10-1 rather than any external reference and correspond to three lines that intersect at a common point substantially at the center of receiver coil assembly 10-1, with each axis being orthogonal to the other two axes.

As described above, in one non-limiting example embodiment, the sensor coils 16Z, 16X, 16Y are multi-turn coreless coil (also referred to as an air core coil when used in air), with Z-axis coil 16Z having a diameter of approximately 26 feet, Y-axis coil 16Y being approximately 7 feet by 24 feet and X-axis coil being approximately 6 feet by 24 feet, however other dimensions, shapes and configurations can be used. As will be appreciated from the above description of FIGS. 1-9, the receiver coil assembly 10-1 can in at least some applications maintain a substantially consistent coil area for each of the coils 16Z, 16X and 16Y and maintain a substantially consistent relative attitude and spacing between the coils.

Analog signals that are representative of the natural magnetic field strength from the Z-coil 16Z, the X-coil 16X and the Y-coil 16Y are provided through a connection box 108 (which may include a low noise amplifier) and cable 124 to an airborne data collection device, which may for example include a computer 122 that will typically be located inside aircraft 86. Computer 122 includes an analog to digital converter device (ADC) 128 connected to receive the analog signals from sensor coils 16Z, 16X and 16Y. In one example embodiment, the ADC device 128 includes three 24-bit analog to digital converter channels (one for each measurement axis) for digitizing the analog signals from the Z-coil 16Z, the X-coil 16X and the Y-coil 16Y simultaneously. In one non-limiting example, the channels are each sampled at 10 KHz, however other sampling rates can be used. For example, a sampling rate in excess of 40 KHz may improve the ability of measuring 4 KHz to 10 KHz range which may for example be associated with shallow targets such as underground water reservoirs.

The on-aircraft computer 122 is equipped with one or more storage elements that can include RAM, flash memory, a hard drive, or other types of electronic storage to store the digitized signals derived from the towed receiver coil assembly 10-1 and other input devices that are connected to computer 122. Computer 122 may be configured to perform data processing functions on the signals that it receives.

In example embodiments, the airborne sensor system 112 or host aircraft includes a Global Positioning System ("GPS") device 138 such that data obtained from the towed receiver coil assembly 13 can be correlated with a geographical position and a GPS time signal. In an example embodiment, the airborne sensor system also includes an altimeter system 136 connected to the airborne computer 122 in order to correlate the data obtained from the towed receiver coil assembly 10-1 with altitude measurements. In an example embodiment, altimeter system 136 includes an altimeter device that provides data about the relative altitude of the towed receiver coil assembly 10-1 above the actual survey terrain. It may also include a further altimeter device that provides an absolute altitude of the towed receiver coil assembly 10-1 above a fixed reference (for example sea level).

The stationary sensor system 114 is similar to the airborne sensor system 112 but is configured to be placed on a stationary base point, and includes a ground based reference receiver coil assembly 10-2 that is substantially identical to the towed receiver coil assembly 10-1. In this regard, the ground based receiver coil assembly 10-2 also includes Z, X and Y sensors 16Z, 16X and 16Y.

As with the airborne sensor system 112, in the stationary sensor system 114, analog signals that are representative of the natural magnetic field strength from the Z-coil 16Z, the X-coil 16X and the Y-coil 16Y are provided through a connection box 108 (which may include a low noise amplifier) and cable 124 to a ground based data collection device, which may for example be a computer 123 that will typically be located near the reference receiver coil assembly 10-2. The ground based data collection computer 123 includes an analog to digital converter device (ADC) 128 connected to receive the analog signals from the three sensor coils 16Z, 16X and 16Y of ground based receiver coil assembly 10-2. In one example embodiment, the ADC device 128 includes three 24-bit analog to digital converter channels (one for each measurement axis) for digitizing the analog signals from the Z-coil 16Z, the X-coil 16X and the Y-coil 16Y simultaneously. In one non-limiting example, the channels are each sampled at a rate that is similar to the sampling rate used at the airborne sensor system computer 122. The ground based data collection computer 123 is equipped with one or more storage elements that can include RAM, flash memory, a hard drive, or other types of electronic storage to store the digitized signals derived from the ground receiver coil assembly 10-2 and other input devices that are connected to computer 123. Computer 123 may also be configured to perform further data processing functions on the signals that it receives. The stationary sensor system 114 includes a Global Positioning System ("GPS") device 138 such that data obtained from the ground based receiver coil assembly 10-2 can be correlated with a GPS time signal and in some cases, a geographical location.

In an example embodiment, the data collected by airborne data collection computer 122 and the data collected by the ground based data collection computer 123 is ultimately transferred over respective communication links 130, 132 (which may be wired or wireless links or may include physical transfer of a memory medium such as laser discs or flash memory cards) to a data processing system such as a data processing computer 126 at which the electromagnetic field data obtained from the receiver coil assemblies 10-1 and 10-2 of sensor systems 112 and 114, data from altimeter system 136 and the GPS data from GPS sensors 138 associated with each of the air receiver coil assembly 10-1 and ground receiver coil assembly 10-24 can all be processed to determine if any anomalies exist that may be indicative of underground body of interest. In some example embodiments, some or all of the processing functions performed by data processing computer 126 may be performed at one or both of the airborne or ground based data collection computers 122 and 123.

In operation, the airborne sensor system 112 can be flown at a substantially constant speed in a series of parallel lines over a survey area to make a series of measurements of the audio frequency range magnetic field in three orthogonal vectors. Simultaneously, the stationary sensor system 114 is located on the ground within the survey region to also make a series of reference measurements of the magnetic field in three orthogonal vectors. The stationary sensor system 114 should, in at least some example uses, be placed a sufficient distance from any industrial electromagnetic field sources such as power lines so that natural audio-frequency magnetic fields dominate the signals received at the location of the stationary sensor system 114 and the residual industrial noise filtered in subsequent signal processing. For example, in one application the distance of the stationary sensor system 114 from a major power lines could be at least 3 Km. In example embodiments, there is no requirement for any special spatial orientation or attitude of the airborne or ground receiver coil assemblies 10-1, 10-2. For example, the X, Y and X axis of the airborne receiver coil assembly 10-1 do not need to be oriented in the same direction as the X, Y and Z axis of the ground based receiver coil assembly 10-2, and the orientation of the airborne assembly 10-1 can change during flight without adversely affecting the survey results.

Thus, as a survey of a region is conducted, the airborne data collection computer 122 receives and stores a stream of digitized data that is representative of the naturally occurring audio frequency magnetic field $B_{z(air)}(t)$ as measured by the airborne Z-axis sensor coil 16Z, the naturally occurring audio frequency magnetic field $B_{x(air)}(t)$ as measured by the airborne X-axis sensor coil 16X and naturally occurring audio frequency magnetic field $B_{y(air)}(t)$ as measured by the airborne Y-axis sensor coil 16Y. Each of the airborne magnetic field measurements is stamped with a GPS location and time information received from the GPS sensor 138, with altitude information from the altimeter system 138, and with coil attitude and orientation information derived from orientation sensors 90. At the same time, the ground based data collection computer 123 receives and stores a stream of digitized data that is representative of the naturally occurring audio frequency magnetic field $B_{z(ref)}(t)$ as measured by the ground based Z-axis sensor coil 16Z, the naturally occurring audio frequency magnetic field $B_{x(ref)}(t)$ as measured by the ground based X-axis sensor coil 16X and the naturally occurring audio frequency magnetic field $B_{y(ref)}(t)$ as measured by the ground based Y-axis sensor coil 16Y. Each of the ground based magnetic field measurements is stamped at least with time information received from the GPS sensor 138, and in some embodiments also with location and coil attitude information. Thus, each of the airborne and stationary sensor systems 112, 114 respectively collect data records that each include three channels of data, each channel corresponding to the magnetic B field measurement taken by a respective one of the sensor coils.

At the signal processing computer 126, the three channel data records from each of the airborne and stationary systems 112, 114 are merged in dependence on the GPS signal time data associated with each of the records to generate records that include six channels of digitized magnetic field data, with each record corresponding to measurements taken at substantially the same time at both the ground and airborne sensor systems.

In one example embodiment, frequency-domain processing is then performed on the data records either through applying narrow-band filters or applying Fast Fourier-transforms on multiple consecutive time blocks, resulting in a time series of data that represents the magnetic B field measured by each of the respective sensor coils at specific audio frequencies. This data includes a real and imaginary number representation of the magnetic field components for each of the X, Y and Z axes as measured in the air and on the ground. The spatial attitude information collected from sensors 90 can be used to correct the magnetic field components for variations that occur in the orientation of receiver coil assemblies 10-1 and 10-2, and thus correct each of the Bz, By and Bz measurements to correspond to physical vertical and horizontal axes. Using this information, the magnitude of the X Y and Z B field vectors at a particular frequency as measured at each of the airborne and ground sensors can be determined and compared for different locations in the survey region. Certain frequencies can be filtered out—for example 60 Hz noise is removed in some embodiments.

In some example, embodiments the stationary sensor system 114 includes only X and Y coils 16X and 16Y for measuring the horizontal magnetic fields.

The measurements taken by geophysical surveying system 110 can be processed using a variety of different processing methods. For example, convention ZTEM-tipper values can be calculated using the airborne vertical axis Bz measurements and stationary horizontal Bx and By measurements, as disclosed for example in U.S. Pat. No. 6,876,202. In some examples, the processing methods disclosed in U.S. Pat. No. 8,289,023, such as the total field and rotationally invariant processing methods disclosed in that patent, can be applied.

In some examples, transfer functions between the stationary B-horizontal and moving B-horizontal fields can be applied. For example the Magnetovariational (MV) Technique can be applied to collected data to provide complementary information that is sensitive to layering and geology with conductive overburden.

In some example's the ZTEM-tipper and MV-transfer functions can be inverted together to provide more constrained resistivity distributions.

Figure 12:
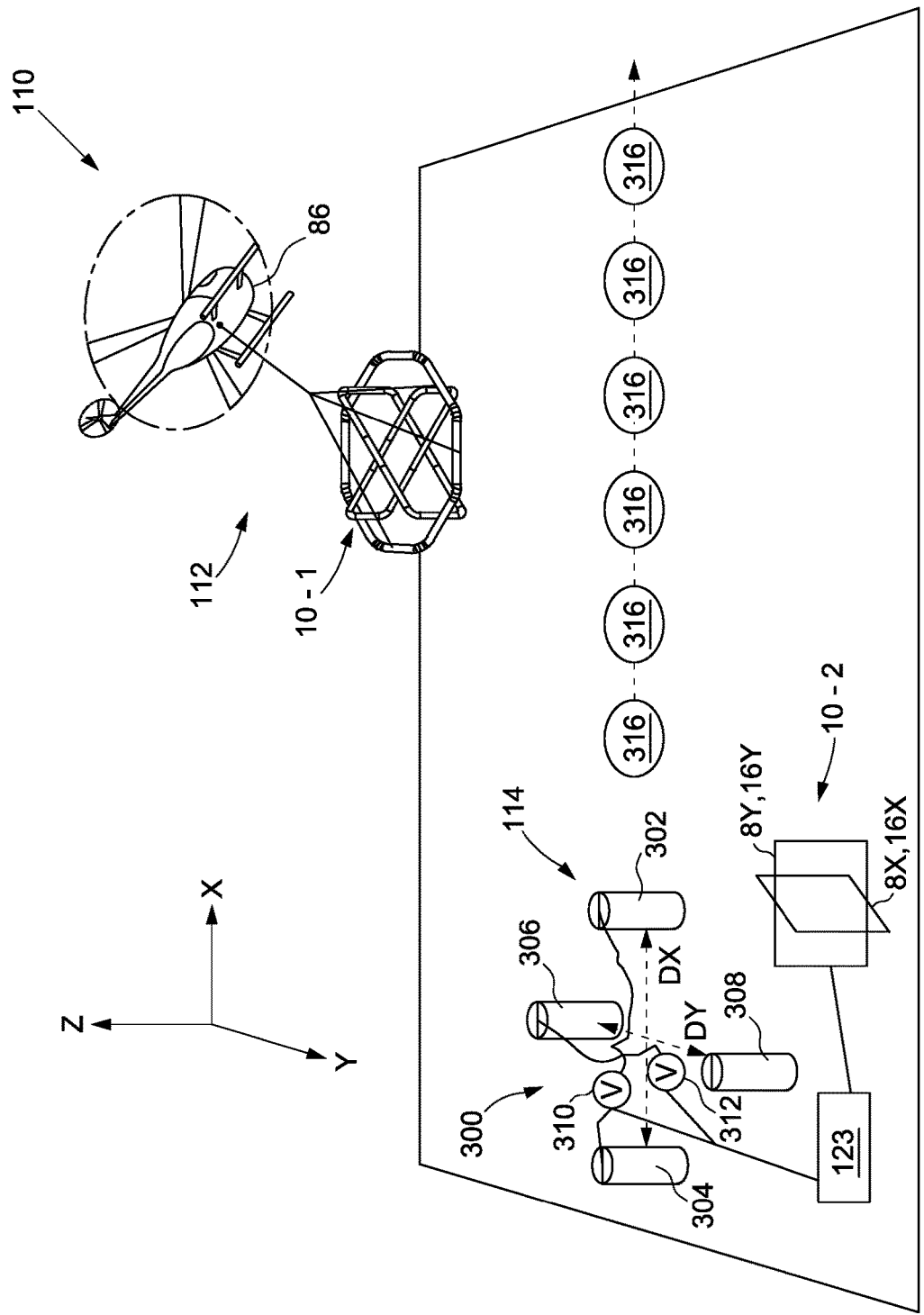
FIG. 12 is a schematic representation of an AFMAG geophysical prospecting system according to another example embodiment of the invention.

In some examples, the collected data can be used to calculate the E-field's spatial variations, from which impedances may be imputed. In this regard, FIG. 12 illustrates a further example embodiment of geophysical prospecting system 110 that is similar to the system described above in respect of FIGS. 10 and 11 with the exception of differences that will be apparent from the drawings and the following description. In the system of FIG. 12, airborne system 112 is identical to the airborne system described above. However, stationary reference system 114 also includes, in addition to stationary receiver coil assembly 10-2, a ground based electrode assembly 300 for measuring reference stationary E-field values in the survey area. In the illustrated example, electrode assembly 300 includes a first pair of electrodes 302, 304 that are spaced apart by a distance Dx along a line runs substantially parallel to the survey flight direction X, and a second pair of electrodes 306, 308 that are spaced apart by a distance Dy along a line that runs substantially perpendicular to the survey flight direction. In one non-limiting example, Dx=Dy=100 m with the electrodes 302, 304, 306, 308 located approximately at four corners of a square, with Dx=Dy being the diagonal distance of the square. The electrodes 302, 304, 306, 308 are configured for measuring an earth potential and in this regard each electrode includes a portion embedded into the ground. By way of example, electrodes 302, 304, 306, 308 can include buried porous pot or embedded conductive rod electrodes. An X-axis voltage sensor 310 is connected to measure a potential between the first pair of electrodes 302, 304 to generate naturally occurring reference X-axis ground E-field measurement $E_{x(ref)}(t)$, and a Y-axis voltage sensor 312 is connected to measure a potential between the second pair of electrodes 306, 308 to generate naturally occurring reference Y-axis ground E-field measurement $E_{y(ref)}(t)$. The outputs of voltage sensors 310, 312 are recorded by data collection computer 123.

In the example shown in FIG. 12, the stationary receiver coil assembly 10-2 includes orthogonal X and Y receiver coils 16X, 16Y for respectively providing naturally occurring reference magnetic field measurements $B_{x(ref)}(t)$ and naturally occurring reference magnetic field measurements $B_{y(ref)}(t)$. Accordingly, ground based data collection computer 123 collects four channels of data: ground reference electrical E-field measurements $E_{x(ref)}(t)$ and $E_{y(ref)}(t)$ as well as ground reference magnetic field measurements $B_{x(ref)}(t)$ and $B_{y(ref)}(t)$. In example embodiments, stationary system 114 is located in or close to the survey area in a magnetically quiet location that has minimal external magnetic and electric field interference (for example, remote from power lines, transformers and generating stations.) In some example embodiments, airborne surveying is conducted within 100 km of the stationary system 114. Depending on local conditions, the survey range with respect to the stationary system could be more or less than 100 km. In some examples, the range may be less than 50 km of the stationary system 114.

Referring to the schematic system diagram of FIG. 12 and the flowchart of FIG. 13, an example method of operation of the surveying system will now be explained in greater detail. A data collection step is represented in block 401. In particular, the airborne sensor system 112 is flown at a substantially constant speed and constant survey height (for example a nominal height of 80 m) in a series of parallel lines at survey height over the survey area to make a periodic series of measurements at the audio frequency range magnetic field at observation points 316 in three orthogonal vectors, namely $B_{z(air)}(t)$, $B_{x(air)}(t)$ and $B_{y(air)}(t)$. Simultaneously, the stationary sensor system 114 produces ground-based reference E-field measurements $E_{x(ref)}(t)$ and $E_{y(ref)}(t)$ as well as ground-based reference magnetic field measurements $B_{x(ref)}(t)$ and $B_{y(ref)}(t)$.

As survey of a region is conducted, the airborne data collection computer 122 receives and stores a stream of digitized data that is representative of the naturally occurring audio frequency magnetic field $B_{z(air)}(t)$, $B_{x(air)}(t)$ and $B_{y(air)}(t)$, stamped with a GPS location and time information received from the GPS sensor 138, with altitude information from the altimeter system 138, and with coil attitude and orientation information derived from orientation sensors 90. At the same time, the ground based data collection computer 123 receives and stores a stream of digitized data that is representative of the naturally occurring audio frequency magnetic fields $B_{x(ref)}(t)$ and $B_{y(ref)}(t)$, as well as ground reference E-field measurements $E_{x(ref)}(t)$ and $E_{y(ref)}(t)$. Each of the ground based magnetic field and E-field measurements are stamped at least with time information received from the GPS sensor 138, and in some embodiments also with location information.

At the signal processing computer 126, the three channel data records from airborne system 112 and the four channel data records from stationary reference system 114 are merged in dependence on the GPS signal time data associated with each of the records to generate records that include seven channels of digitized magnetic field data, with each record corresponding to measurements taken at substantially the same time at both the ground reference and airborne sensor systems.

In one example embodiment, the airborne and ground reference measurements are collected in time series format at a sampling rate of at least 40 Khz. As indicated in Block 403, frequency-conversion is then performed on the data records either through applying narrow-band filters or applying Fast Fourier-transforms on multiple consecutive time blocks, resulting in frequency domain data at multiple specific audio frequencies. In one example, the specific frequencies are in the range of 20 Hz to 1000 Hz. This data includes a real (magnitude) and imaginary (phase) number representation of the magnetic field components for each of the X, Y, and Z axes as measured in the air ($B_{z(air)}(f)$, $B_{x(air)}(f)$ and $B_{y(air)}(f)$) and the X and Y axis magnetic field reference components ($B_{x(ref)}(f)$ and $B_{y(ref)}(f)$) and E-field reference components as measured on the ground ($E_{x(ref)}(f)$ and $E_{y(ref)}(f)$). In some examples, the spatial attitude information collected from sensors 90 can be used in block 403 to correct the magnetic field components for variations that occur in the orientation of receiver coil assemblies 10-1 and 10-2, and thus correct each of the Bz, By and Bz measurements to correspond to physical vertical and horizontal axes. Furthermore. certain frequencies can be filtered out—for example 60 Hz noise is removed in some embodiments.

Data processing computer 126 then performs a set of computations on the frequency domain data to obtain data sets for each of the survey observation points 316 for specific frequencies with the range of 20 Hz to 1000 Hz. In some example embodiments, the specific frequencies could be set be set at predetermined frequency intervals throughout the 20 Hz to 1000 Hz range, for example at three to four frequencies per decade (for example three or four between 10 Hz and 100 Hz, and three to four frequencies between 100 Hz and 1000 Hz). As indicated in Block 405, the tipper coefficients, also known as the magnetic transfer function (Txz(f) and Txy(f)), between the airborne B-field and the reference B-field can be determined based on the Z-axis magnetic B-field values $B_{z(air)}(f)$ for the observations points 316 and the X and Y axis stationary reference B-field values $B_{x(ref)}(f)$ and $B_{y(ref)}(f)$ in accordance with the relationship:

$$B_{z(air)}(f) = Txz(f)B_{x(ref)}(f) + Tyz(f)B_{y(ref)}(f)$$

Methods for calculating the tipper co-efficients/magnetic transfer functions Txz(f), Txy(f) according to the above relationship are disclosed for example in previously mentioned U.S. Pat. No. 6,876,202 issued Apr. 5, 2002.

As indicated at block 407, the E-field at each of the observation points 316 for each of the specific frequencies is then approximated based on the magnetic transfer functions Txz(f) and Tyz(f), the X and Y axis stationary reference B-field values $B_{x(ref)}(f)$ and $B_{y(ref)}(f)$, and the X and Y axis stationary reference E-field values $E_{x(ref)}(f)$ and $E_{y(ref)}(f)$ in accordance with the relationship:

$$E_x(f) = E_{x(ref)}(f) + i\omega\mu B_{y(ref)}(f) fTyz(f)$$

$$E_y(f) = E_{y(ref)}(f) + i\omega\mu B_{x(ref)}(f) fTxz(f)$$

As indicated at block 409, the electrical impedance for the lateral x-y and y-x impedance components at each of the observation points 316 for each of the specific frequencies is then calculated based on the approximated E-field values $E_x(f)$, $E_y(f)$ and the measured X and Y magnetic B-field values $B_{x(air)}(f)$, $B_{y(air)}(f)$ in accordance with the relationship:

$$Zxy(f)=E_x(f)/B_{y(air)}(f)$$

$$Zyx(f)=E_y(f)/B_{x(air)}(f)$$

As indicated at block 411, the apparent resistivity at each of the observation points 316 for each of the specific frequencies are then approximated based on the electrical impedance values Zxy(f), Zyz(f) in accordance with the relationship:

$$Pxy(f)=(1/\omega\mu)|Zxy(f)|^2$$

$$Pyx(f)=(1/\omega\mu)|Zyx(f)|^2$$

Accordingly, at the conclusion of the processing steps shown in FIG. 12, processing computer 126 generates, for multiple observation points 316 in the survey area a data set that includes the following parameters for multiple specific frequencies between 20 Hz to 1000 Hz:

Magnetic Transfer Functions Txy(f) and Tyz(f) (Tipper coefficients);

Approximate Electrical Impedance Zxy(f) and Zyx(f); and

Approximate Resistivity Pxy(f) and Pyx(f).

Geophysical information can be derived by comparing these parameters over the different locations in the survey region. For example, changes in the magnetic transfer functions Txy(f) and Tyz(f) and variations in the resistivity values Pxy(f) and Pyx(f) can be interpreted to provide information about the ore bodies and geophysical composition within the survey region.

In some applications of the geophysical prospecting system 110, the coils 16Z, 16X and 16Y can also be mounted using other types of support configurations—for example, rather than each coil being contained within its own tubular frame section that, the coils could be wound around coil formers located within a spherical protective shell (such as shown for example in above mentioned U.S. Pat. No. 6,876,202). Furthermore, the coils need not be air core coils—for example, they could be permeable core coils. In some embodiments, the sensors could be something other than coils. Alternatively, the airborne receiver coil assembly 10-1 and ground based coil assembly 10-2 could be implemented using 3D superconductive magnetic sensor (SQUID) technology or a low-noisey vector magnetometer. In some example embodiments, the coil frames 8X, 8Y, 8Z could be formed from inflatable components and the receiver coils secured to the inflatable components.

Figure 13:
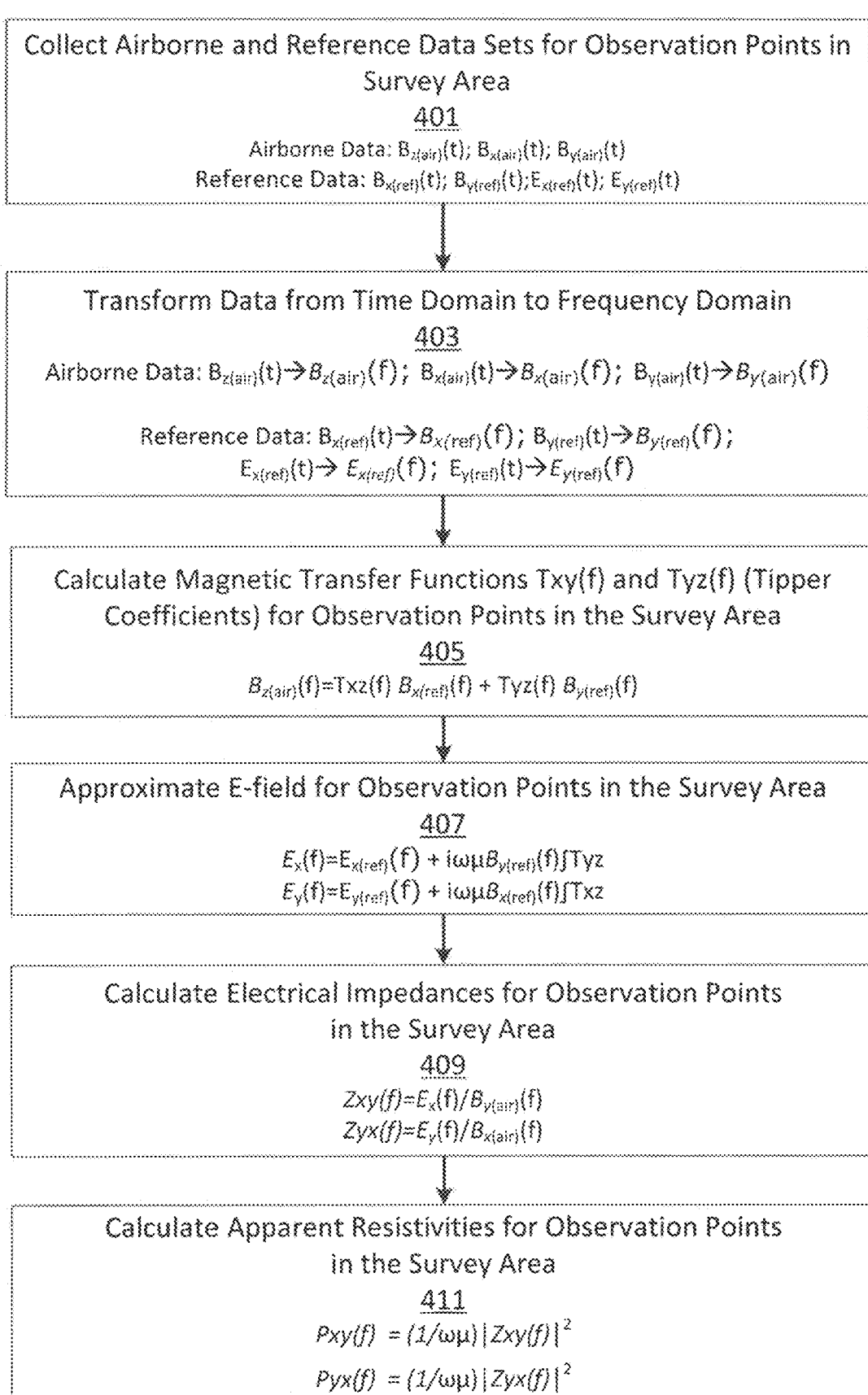
FIG. 13 is a block diagram representing a method of operating the system of FIG. 12 according to example embodiments.

In some examples where use of a reference system 114 is difficult or impermissible (for example in a highly mountainous region), the values that would otherwise be measured by reference system 114 may be derived from pre-existing or simulated reference data sets of reference B and E values that are then substituted into the process of FIG. 13.

It will be appreciated by those skilled in the art that other variations of the embodiments described herein may also be practiced without departing from the scope of the invention. Other modifications are therefore possible.

What is claimed is:

1. A system for geophysical surveying of a survey area, comprising:
an airborne receiver coil assembly for suspending from an aircraft comprising three receiver coils each having a respective sensing axis substantially orthogonal to the sensing axis of each of the other two receiver coils; and
a data collection and processing system configured to:
receive data from the airborne receiver coil assembly for a plurality of observation points in the survey area, the data including measurements of naturally occurring magnetic field data sensed by each of the three receiver coils for the observation points;
transform the measured magnetic field data to the frequency domain;
calculate and store magnetic transfer functions for a plurality of the observation points at a plurality of frequencies based on the transformed measured magnetic field data and reference magnetic field data;
calculate electrical E-field values for the plurality of the observation points at the plurality of frequencies based on the calculated magnetic transfer functions, the reference magnetic field data, and reference electrical E-field data; and
calculate electrical impedance values for the plurality of the observation points at the plurality of frequencies based on the calculated E-field values and the transformed measured magnetic field data; and
calculate and store resistivities for the plurality of the observation points at the plurality of frequencies based on the calculated electrical impedance values,
wherein the system further comprises a reference system comprising:
a reference receiver coil assembly providing the reference magnetic field data and comprising two receiver coils each having a respective sensing axis substantially orthogonal to the sensing axis of the other receiver coil; and
a reference electrode assembly providing the reference electrical E-field data and including a first and second set of electrodes for measuring first and second reference ground potentials at the survey area.

2. The system of claim 1 wherein the reference system is configured to be stationary while geophysical surveying of the survey area is conducted.

3. The system of claim 1 wherein the first set of electrodes and the second set of electrodes each include a pair of spaced apart electrodes each having a portion embedded in ground at the survey area, the first second set of electrodes providing an E-field measurement that is perpendicular to an E-field measurement provided by the first set of electrodes.

4. The system of claim 3 wherein:
(a) the data collection and storage system is configured to calculate and store the magnetic transfer functions for the plurality of the observation points at the plurality of frequencies in accordance with the relationship:

$$B_{z(air)}(f)=Txz(f)B_{x(ref)}(f)+Tyz(f)B_{y(ref)}(f)$$

where: $B_{z(air)}(f)$ represents measured magnetic field data for a vertical sensing axis;
$B_{x(ref)}(f)$ and $B_{y(ref)}(f)$ represent reference magnetic field data for orthogonal sensing axes that are substantially orthogonal to the vertical sensing axis; and
Txz(f) and TyZ(f) are the magnetic transfer functions;
(b) the data collection and storage system is configured to calculate the electrical E-field values for the plurality of the observation points at the plurality of frequencies in accordance with the relationship:

$$E_x(f)=E_{x(ref)}(f)+i\omega\mu B_{y(ref)}(f)fTyz(f)$$

$$E_y(f)=E_{y(ref)}(f)+i\omega\mu B_{x(ref)}(f)fTxz(f)$$

where: $E_{x(ref)}(f)$ and $E_{y(ref)}(f)$ represent reference electrical E-field field data for a pair of substantially orthogonal horizontal directions; and $Ex(f)$ and $Ey(f)$ are the calculated e-field values;

(c) the data collection and storage system is configured to calculate the electrical impedance values for the plurality of observation points at the plurality of frequencies in accordance with the relationship:

$$Zxy(f)=E_x(f)/B_{y(air)}(f)$$

$$Zyx(f)=E_y(f)/B_{x(air)}(f)$$

where: $B_{x(air)}(f)$ and $B_{y(air)}(f)$ represent measured magnetic field data for orthogonal sensing axes that are substantially orthogonal to the vertical sensing axis;

and $Zxy(f)$ and $Zyx(f)$ represent the electrical impedance values;

(d) the data collection and storage system is configured to calculate and store the resistivities for the plurality of the observation points at the plurality of frequencies in accordance with the relationship:

$$Pxy(f)=(1/\omega\mu)|Zxy(f)|^2$$

$$Pyx(f)=(1/\omega\mu)|Zyx(f)|^2$$

where: $Pxy(f)$ and $Pyx(f)$ represent the resistivities.

5. The system of claim 4 where the data collection and processing system includes a first data collection device for receiving the measured magnetic field data from airborne receiver coil assembly, a second data collection device for receiving the reference magnetic field data and the reference electrical E-field field data from the reference system, and a data processing system for processing data received from the first and second data collection devices and storing the processed data.

6. The system of claim 3 wherein the plurality of frequencies includes frequencies within the range of 20 Hz to 1000 Hz.

7. The system of claim 1 wherein the airborne receiver coil assembly comprises:
a first tubular frame that forms a first loop and supports a first receiver coil of the three receiver coils;
a second tubular frame that forms a second loop and supports a second receiver coil of the three receiver coils;
a third tubular frame that forms a third loop and supports a third receiver coil of the three receiver coils;
releasable connectors securing the tubular frames to each other such that the respective sensing axis of each receiver coil is substantially orthogonal to the sensing axis of each of the other two receiver coils.

8. The system of claim 7 wherein the releasable connectors each include a pair of collars arranged at 90 degrees to each other, with one collar engaging of one the tubular frames and the other collar engaging another of the tubular frames.

9. A method comprising:
flying an airborne receiver coil assembly in a series of lines over a survey area to obtain airborne sensed magnetic field data including measurements of naturally occurring magnetic fields for observation points in the survey area sensed by three receiver coils of the airborne receiver coil assembly, each of the receiver coils having a respective sensing axis substantially orthogonal to the sensing axis of each of the other two receiver coils;

receiving reference magnetic field data from a stationary reference receiver coil assembly comprising two receiver coils each having a respective sensing axis substantially orthogonal to the sensing axis of the other receiver coil;

receiving a reference electrical E-field data from a stationary electrode assembly including a first and second set of ground embedded electrodes for measuring first and second reference ground potentials at the survey area;

calculating and storing magnetic transfer functions for the observation points at a plurality of frequencies based on the airborne sensed magnetic field data and the reference magnetic field data;

calculating and storing electrical E-field values for the observation points at the plurality of frequencies based on the calculated magnetic transfer functions, the reference magnetic field data, and the reference electrical E-field data;

calculating and storing electrical impedance values for the plurality of the observation points at the plurality of frequencies based on the calculated E-field values and the airborne sensed magnetic field data;

calculating and storing resistivities for the plurality of the observation points at the plurality of frequencies based on the calculated electrical impedance values; and processing the stored resistivities to extract and output information about a geophysical composition within the survey region.

10. The method of claim 9 wherein:
(a) calculating and storing magnetic transfer functions for the observation points at a plurality of frequencies is performed in accordance with the relationship:

$$B_{z(air)}(f)=Txz(f)B_{x(ref)}(f)+Tyz(f)B_{y(ref)}(f)$$

where: $B_{z(air)}(f)$ represents, in frequency domain, airborne sensed magnetic field data for a vertical sensing axis;

$B_{x(ref)}(f)$ and $B_{y(ref)}(f)$ represent, in frequency domain, reference magnetic field data for orthogonal sensing axes that are substantially orthogonal to the vertical sensing axis; and $Txz(f)$ and $Tyz(f)$ are the magnetic transfer functions;

(b) calculating and storing electrical E-field values for the observation points at the plurality of frequencies is performed in accordance with the relationship:

$$E_x(f)=E_{x(ref)}(f)+i\omega\mu B_{y(ref)}(f)\int Tyz(f)$$

$$E_y(f)=E_{y(ref)}(f)+i\omega\mu B_{x(ref)}(f)\int Txz(f)$$

where: $E_{x(ref)}(f)$ and $E_{y(ref)}(f)$ represent, in frequency domain, reference electrical E-field field data for a pair of substantially orthogonal horizontal directions; and $Ex(f)$ and $Ey(f)$ are the calculated e-field values;

(c) calculating and storing electrical impedance values for the plurality of the observation points at the plurality of frequencies is performed in accordance with the relationship:

$$Zxy(f)=E_x(f)/B_{y(air)}(f)$$

$$Zyx(f)=E_y(f)/B_{x(air)}(f)$$

where: $B_{x(air)}(f)$ and $B_{y(air)}(f)$ represent, in frequency domain, airborne sensed magnetic field data for orthogonal sensing axes that are substantially orthogonal to the vertical sensing axis;

and $Zxy(f)$ and $Zyx(f)$ represent the electrical impedance values;

(d) calculating and storing resistivities for the plurality of the observation points at the plurality of frequencies is performed in accordance with the relationship:

$$Pxy(f) = (1/\omega\mu)|Zxy(f)|^2$$

$$Pyx(f) = (1/\omega\mu)|Zyx(f)|^2$$

where: Pxy(f) and Pyx(f) represent the resistivities.

11. The method of claim 10 wherein at least the magnetic transfer functions and the resistivities are stored in persistent digital storage.

12. The method of claim 9 wherein the plurality of frequencies includes frequencies within the range of 20 Hz to 1000 Hz.

* * * * *